US008588801B2

(12) United States Patent
Gorokhov et al.

(10) Patent No.: US 8,588,801 B2
(45) Date of Patent: Nov. 19, 2013

(54) MULTI-POINT EQUALIZATION FRAMEWORK FOR COORDINATED MULTI-POINT TRANSMISSION

(75) Inventors: Alexei Yurievitch Gorokhov, San Diego, CA (US); V. Sreekanth Annapureddy, Urbana, IL (US); Alan Barbieri, San Diego, CA (US); Siddhartha Mallik, San Diego, CA (US); Stefan Geirhofer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 12/860,742

(22) Filed: Aug. 20, 2010

(65) Prior Publication Data

US 2011/0237272 A1 Sep. 29, 2011

Related U.S. Application Data

(60) Provisional application No. 61/236,008, filed on Aug. 21, 2009.

(51) Int. Cl.
*H04W 72/00* (2009.01)

(52) U.S. Cl.
USPC ....... 455/452.1; 455/509; 455/63.1; 455/513; 455/517; 455/515; 455/446; 455/450; 455/512; 455/524; 370/336; 370/329; 370/315; 370/252; 370/328; 370/312; 370/311

(58) Field of Classification Search
USPC ........ 455/509, 63.1, 513, 517, 515, 446, 450, 455/512, 524; 370/336, 329, 252, 315, 328, 370/312, 311
See application file for complete search history.

(56) References Cited

U.S. PATENT DOCUMENTS

| | | | | |
|---|---|---|---|---|
| 2010/0317355 A1* | 12/2010 | Zangi et al. | | 455/450 |
| 2011/0201371 A1* | 8/2011 | Kwon et al. | | 455/509 |
| 2011/0281585 A1* | 11/2011 | Kwon et al. | | 455/436 |
| 2012/0021738 A1* | 1/2012 | Koo et al. | | 455/422.1 |
| 2012/0028665 A1* | 2/2012 | Kwon et al. | | 455/501 |

OTHER PUBLICATIONS

International Search Report and Written Opinion—PCT/US2010/046383, International Search Authority—European Patent Office, Feb. 15, 2011.
Motorola, "CoMP Operation and Evaluation", 3GPP Draft, R1-091935 Comp Eval Method, 3rd Generation Partnership Project (3GPP), Mobile Competence Centre , 650, Route Des Lucioles , F-06921 Sophia-Antipolis Cedex , France, No. San Francisco, USA, Apr. 28, 2009, XP050339413.

(Continued)

*Primary Examiner* — Joseph Arevalo
(74) *Attorney, Agent, or Firm* — Florin Corie

(57) ABSTRACT

Providing for a multipoint equalization (MPE) framework for coordinated multipoint (CoMP) transmission in wireless communication is described herein. The disclosed MPE framework involves distributed scheduling decisions for CoMP transmission, reducing complexity of scheduling coordination as compared with centralized scheduling techniques that coordinate scheduling decisions for multiple network base stations. Further, the MPE framework involves distributed computation of CoMP transmission coefficients, relying on a maximum of two backhaul hops to obtain information for the computation, and disseminate the transmission coefficients. The disclosed MPE framework shows substantial gains in various network deployments over conventional CoMP techniques.

36 Claims, 17 Drawing Sheets

(56) References Cited

OTHER PUBLICATIONS

Papadogiannis A, et al., "A framework for decentralising multi-cell cooperative processing on the downlink", 2008 IEEE Globecom Workshops IEEE Piscataway, NJ, USA, 2008, p. 5 PP., XP002619290.

Motorola, "CoMP Operation Based on Spatial Covariance Feedback and Performance Results of Coordinated SU/MU Beamforming", 3GPP TSG RAN1#57bis, R1-092943, Jul. 7, 2009.

Potevio, "Discussion of interference coordination for inter-eNB CoMP Transmission", 3GPP TSG-RAN WG1 #57, R1-091970, Apr. 28, 2009.

\* cited by examiner

MULTI-POINT EQUALIZATION FRAMEWORK FOR COORDINATED MULTI-POINT TRANSMISSION

CLAIM OF PRIORITY UNDER 35 U.S.C §119

The present Application for Patent claims priority to Provisional Patent Application Ser. No. 61/236,008 entitled "MULTIPOINT EQUALIZATION FRAMEWORK FOR COORDINATED MULTIPOINT TRANSMISSION" and filed Aug. 21, 2009 assigned to the assignee hereof and hereby expressly incorporated by reference herein.

BACKGROUND

I. Field

The following description relates generally to wireless communications, and more particularly to facilitating wireless communication for terminals observing significant wireless interference.

II. Background

Wireless communication systems are widely deployed to provide various types of communication content, such as voice content, data content, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), or multi-carrier wireless specifications such as evolution data optimized (EV-DO), one or more revisions thereof, etc.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

One advancement in wireless communications that builds on the MIMO system is coordinated multipoint (CoMP) wireless communication. CoMP transmissions employ multiple base stations to transmit separate data signals to a user equipment (UE). In addition, respective base stations can transmit from a single antenna, or from multiple antennas. As a result, the CoMP framework enables coordinated joint transmissions of multiple base stations, which can include direct transmissions, or beamforming transmissions, or a combination thereof.

CoMP transmission achieves increased channel gain for certain wireless environments. For instance, where dominant interferers are present in a wireless network, the gains are generally maximized. However, in open radio access network deployments comprising weaker independent transmitters, coordination among base stations can be limited. Further, where dominant interferers are not present, the overall gains of CoMP transmission can be relatively less than optimal. Accordingly, new mechanisms for improving CoMP gains in various types of deployments with a variety of interference sources are one source of current development in wireless communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the subject disclosure in a simplified form as a prelude to the more detailed description that is presented later.

The subject disclosure provides a multipoint equalization (MPE) framework for coordinated multipoint (CoMP) transmission in wireless communication. The disclosed MPE framework involves distributed scheduling decisions for CoMP transmission, reducing complexity of scheduling coordination as compared with centralized scheduling techniques that coordinate scheduling decisions for multiple network base stations. In addition, the MPE framework shows substantial gains in various network deployments, particularly planned deployments.

As one example implementation, CoMP according to aspects of the subject disclosure can comprise receiving channel state information (CSI) from user equipments (UEs) served by a serving node of a wireless network. The CSI is employed to schedule CoMP transmission for one or more of the UEs that is at least in part independent of scheduling decisions of other non-serving nodes. Once scheduling decisions are determined, nodes report additional CSI information to other nodes that are within a predefined and semi-static backhaul reporting set. A serving node employs received CSI information from these other nodes to compute transmission parameters for individual signals of the CoMP transmission, and distributes respective transmission parameters to a selected subset of the backhaul reporting set, along with data to be transmitted with these individual signals. In this manner, backhaul utilization is limited to two transactions on a backhaul network coupling the nodes. The CoMP transmission is then transmitted by respective nodes in accordance with the respective transmission parameters. Actual gain measurements resulting from these CoMP transmissions can be reported to the serving node to further refine subsequent CoMP transmissions. In this implementation, significant channel gain is observed as compared with prior solutions proposed for CoMP transmission, improving overall wireless communications.

In a particular aspect of the subject disclosure, provided is a method for wireless communication. The method can comprise receiving a first set of CSI from a set of UEs served by a node of a wireless network. Additionally, the method can comprise scheduling a CoMP transmission for a UE of the set of UEs based on the set of CSI. Moreover, the method can comprise calculating, at the node, transmission coefficients for a plurality of signals of the CoMP transmission to be transmitted by respective nodes of the wireless network (a transmission set of nodes).

In further aspects is disclosed an apparatus for wireless communication. The apparatus can comprise memory for storing instructions configured to provide distributed scheduling and distributed signal computation for CoMP wireless communication and a data processor for executing modules that implement the instructions. Specifically, these modules can comprise a receiving module that obtains a first set of CSI from a UE served by the apparatus that pertains to wireless channels between the UE and base stations within a reporting set of base stations, and that obtains a second set of CSI from a backhaul reporting set of base stations pertaining to wireless channels between respective base stations of the backhaul reporting set and a set of UEs expected to be affected by a CoMP transmission to the UE. Additionally, the modules can comprise a distribution module that forwards respective transmission parameters of the CoMP computed by the apparatus to a transmitting set of base stations participating in the CoMP transmission.

In another aspects is disclosed an apparatus for wireless communication. The apparatus can comprise means for receiving a first set of CSI from a set of UEs served by a node of a wireless network. Further, the apparatus can comprise means for scheduling a CoMP transmission for a UE of the set of UEs based on the set of CSI. In addition, the apparatus can also comprise means for calculating, at the node, transmission coefficients for a plurality of signals of the CoMP transmission to be transmitted by respective nodes of the wireless network.

In still other aspects, provided is at least one processor configured for wireless communication. The processor(s) can comprise a first module that receives a first set of CSI from a set of UEs served by a node of a wireless network and a second module that schedules a CoMP transmission for a UE of the set of UEs based on the set of CSI. Furthermore, the processor(s) can comprise a third module that calculates, at the node, transmission coefficients for a plurality of signals of the CoMP transmission to be transmitted by respective nodes of the wireless network.

In yet another aspect, the subject disclosure provides a computer program product comprising a computer-readable medium. The computer-readable medium can comprise a first set of codes for causing a computer to receive a first set of CSI from a set of UEs served by a node of a wireless network. The computer-readable medium can additionally comprise a second set of codes for causing the computer to schedule a CoMP transmission for a UE of the set of UEs based on the set of CSI. Further, the computer-readable medium can comprise a third set of codes for causing the computer to calculate, at the node, transmission coefficients for a plurality of signals of the CoMP transmission to be transmitted by respective nodes of the wireless network.

In addition to the foregoing, one or more disclosed aspects describe a method of wireless communication. The method can comprise obtaining CSI for a set of UEs served by a node of a wireless network. Further to the above, the method can comprise submitting a metric of the CSI to a second node of the wireless network, wherein the node and the second node are included within at least one semi-static backhaul reporting set of base stations pertaining to CoMP wireless communication. In addition, the method can comprise receiving data and transmission coefficients for one signal of the CoMP wireless communication, wherein the transmission coefficients are computed by the second node.

In other aspects, provided is an apparatus for wireless communication. The apparatus can comprise memory for storing instructions configured to provide distributed scheduling for CoMP wireless communication and a data processor for executing modules that implement the instructions. The modules can comprise an uplink module that obtains CSI for a set of UEs served by a node of a wireless network and a distribution module that submits a metric of the CSI to a second node of the wireless network, wherein the node and the second node are included within at least one semi-static backhaul reporting set of base stations pertaining to coordinated multipoint (CoMP) wireless communication. Moreover, the apparatus can comprise a receiving module that obtains data and transmission coefficients for one signal of the CoMP wireless communication, wherein the transmission coefficients are computed by the second node.

Further still, one or more aspects provide an apparatus for wireless communication. The apparatus can comprise means for obtaining CSI for a set of UEs served by a node of a wireless network. Additionally, the apparatus can comprise means for submitting a metric of the CSI to a second node of the wireless network, wherein the node and the second node are included within at least one semi-static backhaul reporting set of base stations pertaining to CoMP wireless communication. Further, the apparatus can comprise means for receiving data and transmission coefficients for one signal of the CoMP wireless communication, wherein the transmission coefficients are computed by the second node.

In yet another aspect, provided is at least one processor configured for wireless communication. The processor(s) can comprise a first module that obtains CSI for a set of UEs served by a node of a wireless network. In addition, the processor(s) can comprise a second module that submits a metric of the CSI to a second node of the wireless network, wherein the node and the second node are included within at least one semi-static backhaul reporting set of base stations pertaining to CoMP wireless communication. Moreover, the processor(s) can comprise a third module that receives data and transmission coefficients for one signal of the CoMP wireless communication, wherein the transmission coefficients are computed by the second node.

Still other aspects of the subject disclosure provide a computer program product comprising a computer-readable medium. The computer-readable medium can comprise a first set of codes for causing a computer to obtain CSI for a set of UEs served by a node of a wireless network. In addition, the computer-readable medium can comprise a second set of codes for causing the computer to submit a metric of the CSI to a second node of the wireless network, wherein the node and the second node are included within at least one semi-static backhaul reporting set of base stations pertaining to CoMP wireless communication. Further, the computer-readable medium can comprise a third set of codes for causing the computer to receive data and transmission coefficients for one signal of the CoMP wireless communication, wherein the transmission coefficients are computed by the second node.

Further to the above, various aspects provide a method of wireless communication. The method can comprise measuring received wireless signals from a set of neighboring base stations and identifying a set of wireless signals of the received wireless signals that are above a minimum threshold signal strength that is related to a target carrier to residual interference level. In addition, the method can comprise determining CSI for the set of wireless signals and calculating CQI from the CSI independent of scheduling decisions of the set of neighboring base stations.

In another aspect, provided is an apparatus for wireless communication. The apparatus can comprise memory for storing instructions to facilitate distributed scheduling for CoMP transmission and a data processor for executing modules that implement the instructions. Particularly, the modules can include an analysis module that measures received wireless signals from a set of neighboring base stations and that identifies a set of wireless signals of the received wireless signals that are above a minimum threshold signal strength related to a target carrier to residual interference level. In addition, the modules can include a computation module that determines CSI for the set of wireless signals and calculates CQI from the CSI independent of scheduling decisions of the set of neighboring base stations.

In yet other aspects, disclosed is an apparatus for of wireless communication. The apparatus can comprise means for measuring received wireless signals from a set of neighboring base stations and means for identifying a set of wireless signals of the received wireless signals that are above a minimum threshold signal strength that is related to a target carrier to residual interference level. Moreover, the apparatus can comprise means for determining CSI for the set of wireless signals and means for calculating CQI from the CSI independent of scheduling decisions of the set of neighboring base stations.

In another disclosed aspect, provided is at least one processor configured for wireless communication. The processor(s) can comprise a first module that measures received wireless signals from a set of neighboring base stations and a second module that identifies a set of wireless signals of the received wireless signals that are above a minimum threshold signal strength that is related to a target carrier to residual interference level. Moreover, the processor(s) can comprise a third module that determines CSI for the set of wireless signals and a fourth module that calculates CQI from the CSI independent of scheduling decisions of the set of neighboring base stations.

In a further aspect, the subject disclosure provides a computer program product comprising a computer-readable medium. The computer-readable medium can comprise a first set of codes for causing a computer to measure received wireless signals from a set of neighboring base stations. In addition, the computer-readable medium can comprise a second set of codes for causing the computer to identify a set of wireless signals of the received wireless signals that are above a minimum threshold signal strength that is related to a target carrier to residual interference level. Furthermore, the computer-readable medium can comprise a third set of codes for causing the computer to determine CSI for the set of wireless signals and a fourth set of codes for causing the computer to calculate CQI from the CSI independent of scheduling decisions of the set of neighboring base stations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
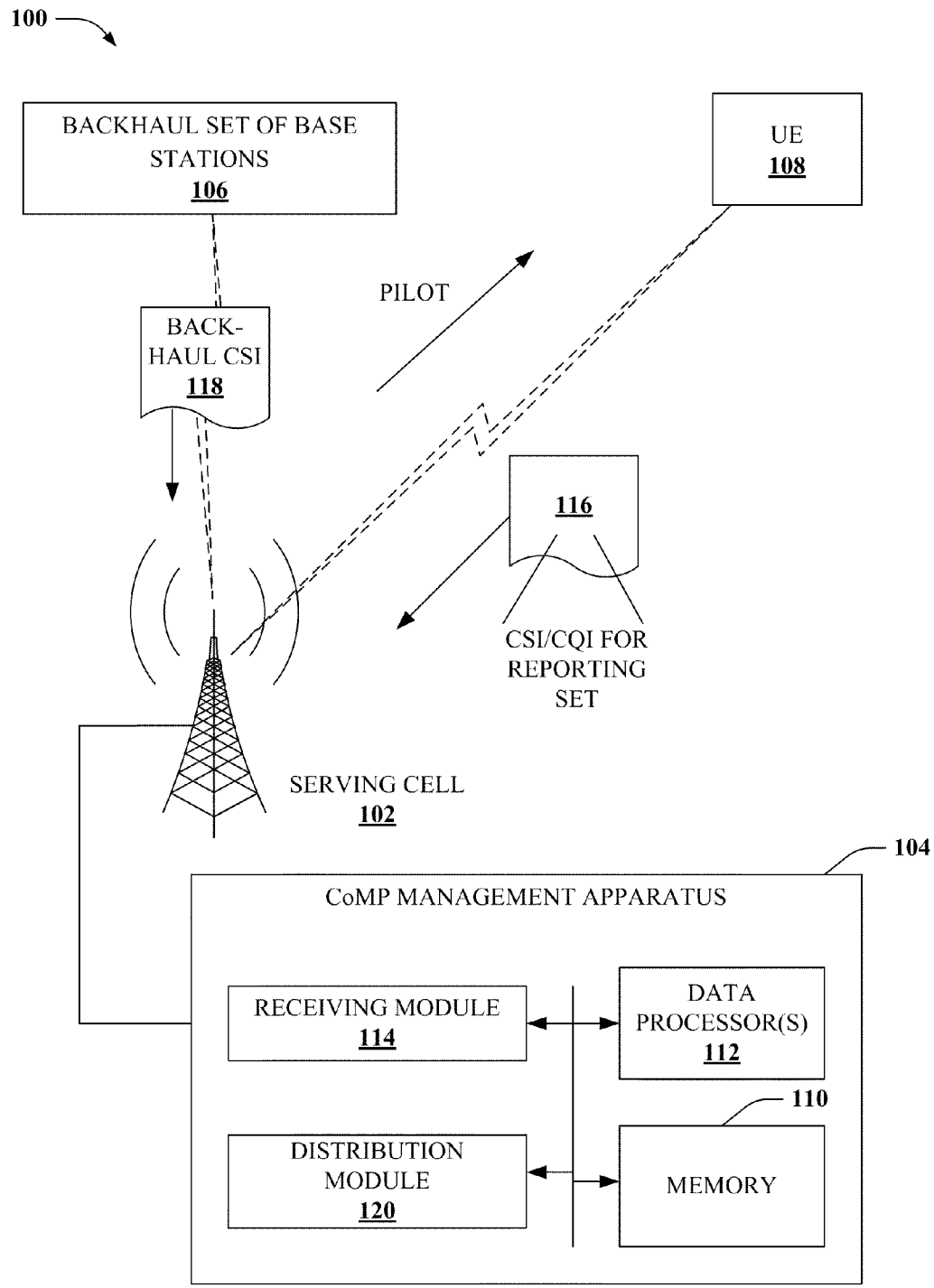
FIG. 1 illustrates a block diagram of a sample wireless communication environment for coordinated multipoint (CoMP) wireless communications.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of providing multipoint equalization framework for coordinated multipoint wireless communication, among other things. One skilled in the art should appreciate that similar techniques could apply to other communication environments.

Planned deployments of wireless base stations (BSs) in a wireless access network (AN) typically consider position, spacing and transmission/receive characteristics of transceiver devices. One goal of planned base station deployment is to reduce interference among transmitters. Thus, for instance, one deployment plan might space different base stations apart by a distance approximately equal to their respective maximum transmit ranges. In this type of deployment, signal interference between the base stations is minimized in many circumstances. However, for a mobile terminal near the edge of two adjacent cells, signals of a neighboring cell can be observed with comparable strength as those of a serving cell. In this case, the neighboring cell can cause significant interference to the mobile terminal even in a planned network deployment.

Aspects of the subject innovation supply a de-centralized manner of scheduling and defining parameters in a joint transmission cell environment—wherein scheduling for base stations are performed independent of each other, despite the fact that a plurality of base stations are involved in transmitting packets to a target user equipment (UE). Such an arrangement aggregates multiple cells, and transmits data to multiple UEs on a downlink, to effectively steer energy to users of interest and mitigate interferences among UEs (e.g., orthogonalize various transmissions to the UEs, wherein packets reaching the UE of interest enhance energy while mitigating interference to other UEs.)

As such, while the scheduling occurs in a de-centralized fashion, the scheduling decisions and channel state information corresponding with respective UEs can be shared there between. Hence, the actual beams and/or transmit waves with which packets are to be transmitted, arrive from different base stations—while maintaining high transmittal energy and reducing interferences to other users. Based on such data, the associated transmission coefficients can then be computed in a distributed fashion and employed by the base stations. Respective transmission coefficients can be propagated throughout the wireless communication system, wherein at each cell, packets that are to be transmitted are identified and scheduling/channel information are shared—followed by actual transmission of data packets. This is in contrast to conventional coordination that primary focuses on handover regions among base stations and associated clustering on neighboring cells, or centralized multipoint coordination involving complex inter-cell determinations of scheduling for centralized initial UE scheduling.

Turning now to the drawings, FIG. 1 illustrates a block diagram of an example wireless system 100 suitable to implement distributed scheduling for coordinated multipoint (CoMP) wireless communication, according to various aspects of the subject disclosure. Wireless system 100 includes a serving cell 102 of a wireless network that includes or is coupled with a CoMP management apparatus 104. CoMP management apparatus 104 is configured generally to provide distributed scheduling for CoMP wireless communications. As utilized herein, distributed scheduling refers to performing activity involved in conducting a particular wireless transmission for a UE at a serving cell (e.g., serving cell 102) supporting the UE, rather than at a centralized network entity (e.g., a radio network control, a mobility management entity, a base station controller, another base station, and so on, see FIG. 16, infra) that implements the activity on behalf of serving cell 102 or other cells. Examples of distributed scheduling activity can include selecting a UE for a data transmission in a given time subframe or time subslot, assigning a wireless resource location within a subframe (e.g., time-frequency resources) to the UE for the data transmission, submitting channel quality information (CQI) feedback to the UE in response to a channel quality or channel state report, and so on.

Further to the above, CoMP management apparatus 104 can further perform at least a subset of scheduling activity independent of scheduling decisions of other cells of a wireless network. Conventionally, it is assumed that CoMP communication requires a high degree of information sharing among cells involved in, or affected by interference from, the CoMP communication. This assumption derives from the fact that a data transmission sent by multiple cells concurrently can potentially increase both the amount of network interference caused by that data transmission, and the scope of the network interference, thereby affecting a larger number of UEs over a greater geographical region. In the case where a set of cells are conducting multiple CoMP transmissions in a single subframe, the overall interference for the set of cells and for surrounding cells can be a complex function, rendering conventional interference mitigation techniques difficult, e.g., isolated or coordinated beamshaping, signal cancellation, transmit power reduction, channel prediction and resource selection, etc., and on a network-wide basis, prohibitively so. Further, this information sharing can conventionally require several information hops—one-way exchanges of data between cells—to achieve sufficient channel gain to make the CoMP communication worthwhile. At a minimum, information shared between cells adds overhead on a backhaul network coupling the cells, reducing efficacy of a wireless network. In addition, larger numbers of information hops add significant delay in various wireless deployments, depending on latency of the backhaul network. Increased delay further reduces wireless efficacy.

To address these or related problems, particular aspects of the subject disclosure provide a multipoint equalization (MPE) framework that facilitates performing at least some distributed scheduling activity independent of scheduling decisions of other cells. This can greatly reduce complexity of inter-cell coordination for CoMP transmissions, and reduces a number of backhaul hops necessary to implement the CoMP transmissions. As is discussed in more detail herein, the MPE framework can achieve CoMP communication with a maximum of two backhaul hops.

CoMP management apparatus 104 can comprise memory 110 for storing instructions configured to provide distributed scheduling and distributed signal computation for CoMP wireless communication, and a data processor 112 for executing modules that implement the instructions. Particularly, CoMP management apparatus 104 can comprise a receiving module 114 that obtains a first set of channel state information (CSI) 116 from a UE 108 served by serving cell 102. First set of CSI 116 pertains to wireless channels between the UE and base stations within a reporting set of base stations (not depicted—but see FIGS. 3 and 4, infra). As utilized herein, the reporting set of base stations are determined with respect to individual UEs of a wireless network, such as UE 108, and are selected from base stations that are within a measurement set of base stations, up to a maximum number of reporting set base stations. Thus, a number of base stations in the reporting set≤a number of base stations in the measurement set. Further, the measurement set of base stations associated with UE 108 is defined as comprising those base stations whose respective pilot signals above a minimum threshold signal strength, as observed by UE 108. This minimum threshold signal strength is established by serving cell 102 to identify base stations having un-coordinated or substantially un-coordinated long-term carrier to residual interference level (C/I) above a target C/I level with respect to UE 108 (where long-term can refer to statistical averaging of C/I over multiple subframes, in one aspect, and where residual interference level is discussed in more detail below). This distinguishes the minimum threshold signal strength and the measurement set of base stations from an active set of base stations employed for handover determinations in various wireless systems (e.g., an evolution data optimized [EV-DO] wireless system), as the target C/I level is set to determine channel quality information (CQI) and related transmission parameters, such as channel gain, rate assignments, bandwidth assignments, and so on, to facilitate wireless transmissions, rather than handover determinations. The measurement set and reporting set can, however, change over time, and first set of CSI 116 periodically transmitted by UE 108 reflects changes in the report set of base stations.

Based on first set of CSI 116 obtained from UE 108, serving cell 102 can independently schedule transmissions, including CoMP transmissions, for UEs served by serving cell 102. Transmission scheduling can include selecting which UE served by serving cell 102 will transmit in a given subframe, and allocating time-frequency resources to respective UEs for respective transmissions, and optionally providing CQI feedback based on first set of CSI 116. First set of CSI 116 can enable CoMP management apparatus 104 to determine short-term channel quality (on an order of one or two subframes or less) for wireless channels between serving cell 102, UE 108 and other UEs served by serving cell 102 (not depicted). In addition, first set of CSI 116 can enable CoMP management apparatus 104 to determine long-term interference (e.g., residual interference) and background thermal noise for other wireless channels (e.g., supported by base stations other than serving cell 102). This respective short-term channel quality and long-term interference/thermal noise facilitates the independent distributed scheduling decisions with adequate efficacy, without minimal to no backhaul overheard. This is a significant advantage over conventional CoMP communication.

In at least one aspect, CoMP management apparatus 104 can estimate channel gain or residual interference from first set of CSI 116 for UEs served by serving cell 102. This can be employed for time-frequency resource allocation and CQI feedback, and can also be utilized to estimate a data rate, bandwidth assignment, or modulation and coding scheme (MCS) in at least one aspect of the subject disclosure. Thus in one instance, transmission assignments for UE 108 can be partly independent of scheduling decisions of other base stations, whereas in other aspects the transmission assignments can be wholly independent of those scheduling decisions.

As utilized herein, a residual interference level is defined as received signal energy observed at UE 108, minus signal energy of pilot signals transmitted by base stations in the reporting set (or optionally base stations within the measurement set). Thus, the residual interference comprises an aggregation of signals that are individually below the minimum threshold signal strength determined by the long-term C/I threshold. The residual interference can be employed by CoMP management apparatus 104 to estimate channel quality of wireless channels associated with UE 108, which is affected by interference from other wireless channels. Particularly, this channel quality estimation can be performed without knowledge of scheduling decisions of the reporting set of base stations, utilizing a statistical multiplexing approach. For instance, base stations in a wireless network are generally performing scheduling decisions based on a large number of constraints, and those constraints are generally statistically independent. Accordingly, short-term channel noise utilized for channel quality estimations can be approximated with an average noise level to reasonable accuracy. Based on this information, more accurate scheduling decisions can be performed by serving cell 102, without specific knowledge of scheduling decisions of other cells.

In addition to the foregoing, receiving module 114 also obtains a second set of CSI 118 from a backhaul reporting set 106 of base stations pertaining to wireless channels between respective base stations of backhaul reporting set 106 and a set of UEs expected to be affected by a CoMP transmission to the UE. Backhaul reporting set 106 is defined as a semi-static set of base stations with respect to serving cell 102, and comprises base stations that serve UEs expected to observe interference as a result of multiple base stations participating in a CoMP transmission to UE 108. As one example, affected UEs can include those UEs that observe interference from a data transmission of the CoMP transmission directed at UE 108, or that observe interference from a mitigation transmission of the CoMP transmission that is configured to reduce interference to a UE from the data transmission, or reduce interference from another mitigation transmission (where a mitigation transmission is a data transmission that destructively interferes with another transmission of the CoMP transmission, to reduce interference to a particular UE or set of UEs—see FIG. 4, infra). The backhaul reporting set can be determined from long-term channel strength measurements for all transmissions estimated for a CoMP transmission, and can be updated to include or exclude one or more base stations as appropriate. Further, backhaul reporting set 106 is controlled by serving cell 102. It should be appreciated, however, that other backhaul reporting sets can be defined for wireless system 100, that are controlled by another base station(s) (not depicted). Serving cell 102 can be a member of these backhaul reporting sets, but will generally control only backhaul reporting set 106.

Once second set of CSI 118 is obtained by receiving module 114, CoMP management apparatus 104 can proceed to compute transmission parameters (e.g., weights) for individual transmissions of a CoMP transmission assigned to UE 108. In one instance, second set of CSI 118 is based on scheduling decisions of base stations within backhaul reporting set 118, and therefore the transmission parameters can be computed based on short-term channel quality estimates of wireless channels outside of the reporting set associated with UE 108, described in more detail herein. Once the transmission parameters are determined, a distribution module 120 can be employed that forwards respective transmission parameters of the CoMP transmission computed by CoMP management apparatus 104 to a transmitting set of base stations participating in the CoMP transmission. Selection of base stations for the transmitting set is described in more detail at FIG. 2, infra.

Figure 2:
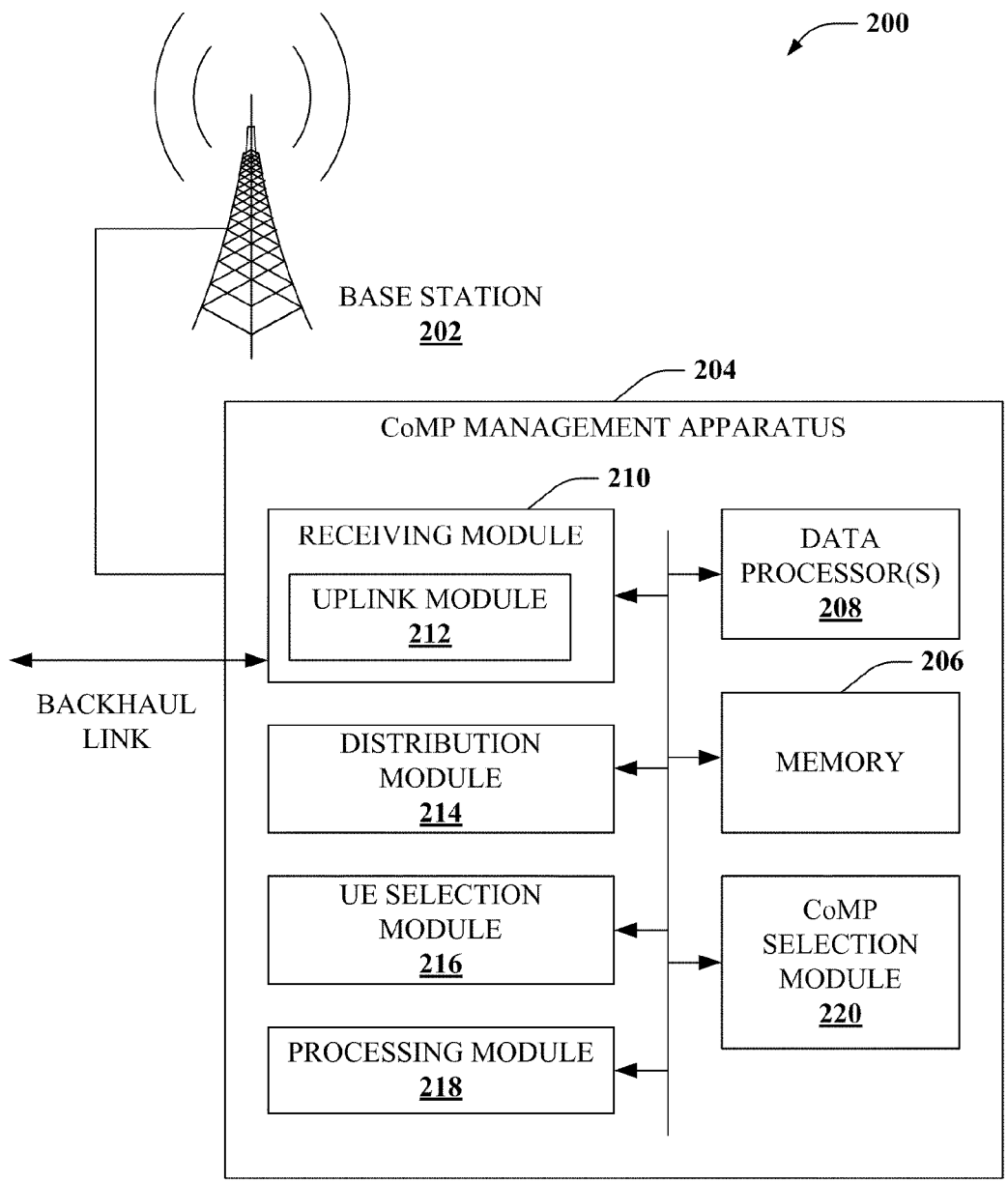
FIG. 2 depicts a block diagram of a sample apparatus providing a multipoint equalization (MPE) framework for CoMP wireless communications.

FIG. 2 depicts a block diagram of an example wireless system 200 configured for CoMP wireless communication according to particular aspects of the subject disclosure. Wireless system 200 comprises a base station 202 that includes or is coupled with a CoMP management apparatus 204. In at least some aspects of the subject disclosure, CoMP management apparatus 204 includes some or all features of CoMP management apparatus 104 of FIG. 1, supra. However, the subject disclosure is not limited to these aspects, and CoMP management apparatus 204 can include all or none of those features, as well as additional features described below.

Particularly, CoMP management apparatus 204 can comprise memory 206 for storing instructions pertaining to implementing independent and distributed scheduling for CoMP transmissions supported by base station 202. Further, memory 206 can store instructions for implementing distributed CoMP transmission parameter computation with a maximum of two backhaul hops. A data processor 208 is employed to execute modules that implement these instructions.

Figure 3:
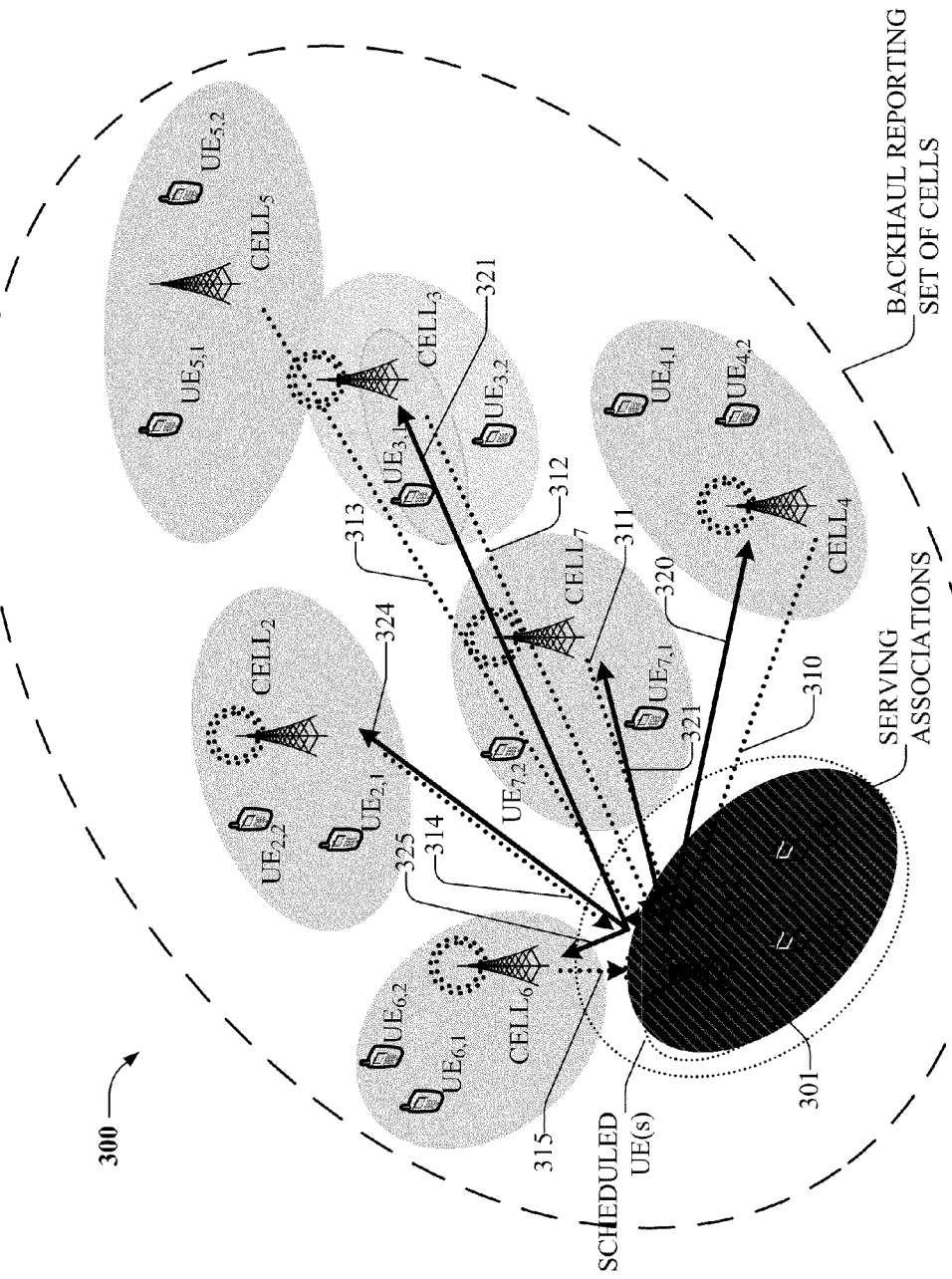
FIG. 3 illustrates a diagram of an example wireless environment for an MPE framework for various aspects of the subject disclosure.

A receiving module 210 is employed by CoMP management apparatus 204 to receive channel state information pertaining to UEs served by base station 202 (a first set of CSI), and channel state information pertaining to UEs served by other base stations (a second set of CSI) within a backhaul reporting set controlled by base station 202 (not depicted, but see FIG. 1, supra, or FIGS. 2 and 3, infra). Furthermore, the first set of CSI is reported prior to scheduling decisions for a given subframe of wireless communication.

Based on the first set of CSI, a UE selection module 216 can be employed that schedules a CoMP transmission for a UE served by base station 202 within the subframe. Particularly, scheduling for the UE can be independent of scheduling decisions of base stations separate from CoMP management apparatus (base stations other than base station 202) where UE selection module 216 employs channel conditions derived from the first set of CSI for scheduling the UE. Furthermore, the scheduling can be performed prior to receiving the second set of CSI, enabling the scheduling to be performed quickly and independent of backhaul latency. The first set of CSI can be obtained via an uplink module 212 over uplink channels assigned to UEs served by base station 202. Additionally, the second set of CSI can be obtained by uplink module 212 over-the-air in some aspects of the subject disclosure, or can be obtained over a backhaul link utilizing a backhaul interface (not depicted) of receiving module 210. In some aspects, the second set of CSI can be obtained over the backhaul link and over-the-air from different base stations within the backhaul reporting set.

Further to the above, CoMP management apparatus 204 can comprise a processing module 218 that determines respective transmission parameters for CoMP transmission scheduled by base station 202, at least in part from the first set of CSI or the second set of CSI. In general though, processing module 218 can employ both the first set of CSI and the second set of CSI for determining the respective transmission parameters. Particularly, the first set of CSI can be utilized to estimate short-term channel quality of wireless channels within a reporting set associated with the UE, whereas the second set of CSI can be utilized to estimate channel quality of wireless channels outside the reporting set, based on scheduling decisions of base stations supporting these latter wireless channels. The transmission parameters can be based on respective channel quality estimates of the wireless channels within the reporting set and wireless channels outside the reporting set.

In addition, various functions can be employed for determining the transmission parameters and wireless channel quality estimations/determinations. As one example, processing module 218 estimates channel gain for wireless channels between a UE served by base station 202 and base stations of the reporting set associated with the UE, and optionally derives a ratio of estimated channel gain and an actual channel gain previously reported by the UE, and determines respective transmission parameters at least in part based on the estimated channel gain or the ratio. In another example, processing module 218 performs an interference mitigation analysis for base station 202 and base stations within the reporting set, and determines the respective transmission parameters at least in part based on the interference mitigation analysis. Thus, for instance, transmission weights associated with the transmission parameters can be selected to mitigate interference among wireless channels involving the reporting set and wireless channels involving base station 202. One specific set of algorithms for determining the respective transmission parameters is provided in Appendix A of U.S. Provisional Patent Application Ser. No. 61/236,008, under "MPE construction algorithm", on pages 20-26 of Appendix A; both of U.S. Provisional Patent Application 61/236,008 and Appendix A thereof being incorporate in their entireties in the subject disclosure.

In particular aspects of the subject disclosure, CoMP management apparatus 204 can further comprise a CoMP selection module 220 that selects a transmitting set of base stations participating in the CoMP transmission to the UE (e.g., assigned to transmit a data transmission or a mitigation transmission) from a backhaul reporting set of base stations associated with base station 202. As an example, CoMP selection module 220 employs the second set of CSI to exclude base stations of the backhaul reporting set from the transmitting set that are not within the reporting set of base stations, and that serve UEs predicted to observe interference as a result of the CoMP transmission below a threshold interference level. For instance, transmission points that minimize the maximum C/I loss observed by UEs affected by the CoMP transmission (scheduled UEs with reported channels) can be removed from the transmission set. Additionally, the CoMP selection module 220 can institute a maximum number of transmitting base stations for the transmitting set. Thus, base stations within the backhaul reporting set can be pruned from the transmission set if the maximum number is reached.

Once the respective transmission parameters are determined by processing module 218 and the transmission set of base stations defined by CoMP selection module 220, a distribution module 214 can be employed to forward respective transmission parameters, as well as data for the CoMP transmission, to respective base stations of the transmitting set. These base stations then send respective transmissions of the CoMP transmission per the respective transmission parameters. Once received by the UE, actual channel gain measurements can be taken and reported to base station 202 to further refine subsequent CoMP transmissions, as discussed in more detail herein (e.g., see FIG. 5, infra).

In addition to the foregoing and as mentioned above, base station 202 can be included as part of at least one second backhaul reporting set associated with another base station (not depicted). In general, it is likely that base station 202 will be a member of a set of backhaul reporting sets, controlled by different base stations (some of which are members of the backhaul reporting set controlled by base station 202). In this case, CoMP management apparatus 204 can be configured with additional functionality to assist CoMP transmissions for the set of backhaul reporting sets.

Where CoMP management apparatus 204 is configured to support CoMP transmissions of other backhaul reporting sets, memory 206 can comprise instructions configured to provide distributed scheduling and backhaul reporting for CoMP wireless communication. In this implementation, uplink module 212 obtains CSI for a set of UEs served by a node of a wireless network, such as base station 202. Distribution module 214 submits a metric of the CSI to a second node of the wireless network, wherein the node and the second node are included within at least one semi-static backhaul reporting set of base stations (controlled by the second node) pertaining to the CoMP wireless communication. Further, receiving module 210 obtains data and transmission coefficients for one signal of the CoMP wireless communication, wherein the transmission coefficients are computed by the second node. A wireless transmitter of base station 202 (e.g., see FIG. 6, infra) is employed to send the data within the one signal in accordance with the transmission coefficients to participate in the CoMP wireless communication.

According to various aspects, the signal can be a data transmission intended to be received by a UE served by the second node, or can be a mitigation transmission to reduce interference to one or more other UEs as a result of the CoMP communication. In either case, the one signal transmits the same data (although beamshaping can be implemented differently according to the transmission coefficients for the mitigation transmission and the data transmission). Thus, in one instance, the one signal is configured to comprise one of multiple downlink transmissions conveying the data to the UE served by the second node. In another instance, the one signal is configured to mitigate interference to one of the set of UEs resulting from the CoMP wireless communication. In the latter case, the one signal can be configured to mitigate interference to a UE served by a third node of the wireless network, whether the third node is in a reporting set, transmission set or backhaul reporting set, or outside of all of these sets of base stations.

Additionally to the foregoing, in various aspects distribution module 214 comprises a backhaul interface that employs a backhaul link coupling the node with the second node for transmitting the metric of the CSI to the second node. In an alternative implementation, distribution module employs the wireless transmitter of base station 202 to send the metric of the CSI to the second node over-the-air.

In a similar manner as for CoMP transmissions initiated by serving base station 202, UE selection module can be configured as a module that schedules one of a set of UEs for a second CoMP wireless communication targeting the one of the set of UEs, independent of scheduling decisions of other base stations of the backhaul reporting set. This second CoMP wireless communication can be implemented concurrently with the CoMP wireless communication established by the second node (e.g., in a single subframe). Accordingly, CoMP management apparatus 204 can be configured to be a dynamic entity that both initiates distributed scheduling and transmission parameterization for CoMP transmissions, as well as facilitates such for other CoMP transmissions of other base stations.

FIG. 3 illustrates a diagram of an example networking environment 300 comprising a CoMP wireless communication according to aspects of the subject disclosure. As depicted by networking environment 300, the actual beams and/or transmit waves with which packets are to be transmitted to a UE, arrive from different base stations. Based on the MPE framework disclosed herein, transmission coefficients for these beams/waves can be generated to maintain high transmittal energy and reduce interference to other users. Particularly, associated transmission coefficients can then be computed and employed by the base stations. Such can be propagated throughout the wireless communication system, wherein at each cell, packets that are to be transmitted are identified and scheduling/channel information is shared—followed by actual transmission of data packets.

As illustrated example networking environment 300 comprises a backhaul reporting set including cells within the large dashed oval. Particularly, these cells include a first cell, $cell_1$ 301, a second cell, $cell_2$, a third cell, $cell_3$, a fourth cell, $cell_4$, a fifth cell, $cell_5$, a sixth cell, $cell_6$, and a seventh cell, $cell_7$. In example networking environment 300, each cell serves two UEs; although this is for illustrative purposes only and is not intended to reflect actual implementations. Further according to the example implementation of networking environment 300, each cell selects one of the respective two UEs for data transmission in a given subframe, depicted by respective small ovals encompassing the respective cells and respective UEs. Larger gray shaded ovals delineate serving associations for respective cells. As a specific example, $cell_1$ 301 is encompassed by a larger dotted oval indicating serving associations of $cell_1$ 301, and a smaller dotted oval indicated $UE_{1,1}$ which is scheduled in the subframe by $cell_1$ 301. A similar arrangement of serving associations and scheduled UE(s) is depicted by the light and dark shaded ovals of the other cells.

Upon scheduling respective UEs for the subframe, cells transmit respective CSI data reflecting the scheduling decisions to $cell_1$ 301, depicted by bold dotted arrows, at 310, 311, 312, 313, 314, 315. This scheduling data or channel state information related are transmitted to $cell_1$ 301 over a wired backhaul network coupling each cell of the backhaul reporting set, or can be wholly or partially over-the-air (e.g., a wireless backhaul implementation). $Cell_1$ 301 then determines required transmission coefficients that enable strongest energy for transmittal to its associated UEs, while mitigating interference for other UEs associated with other cells. Subsequently and as depicted by the bold solid arrows 320, 321, 322, 324, 323, the $cell_1$ 301 transmits respective transmission coefficients to respective cells of a set of transmission cells (depicted graphically by circular dotted rings over the cells of the set of transmission cells), which can be a subset of the backhaul reporting set. As described herein, the set of transmission cells can exclude cells of the backhaul reporting set based on a C/I determination that minimize overall C/I of the CoMP communication.

Figure 4:
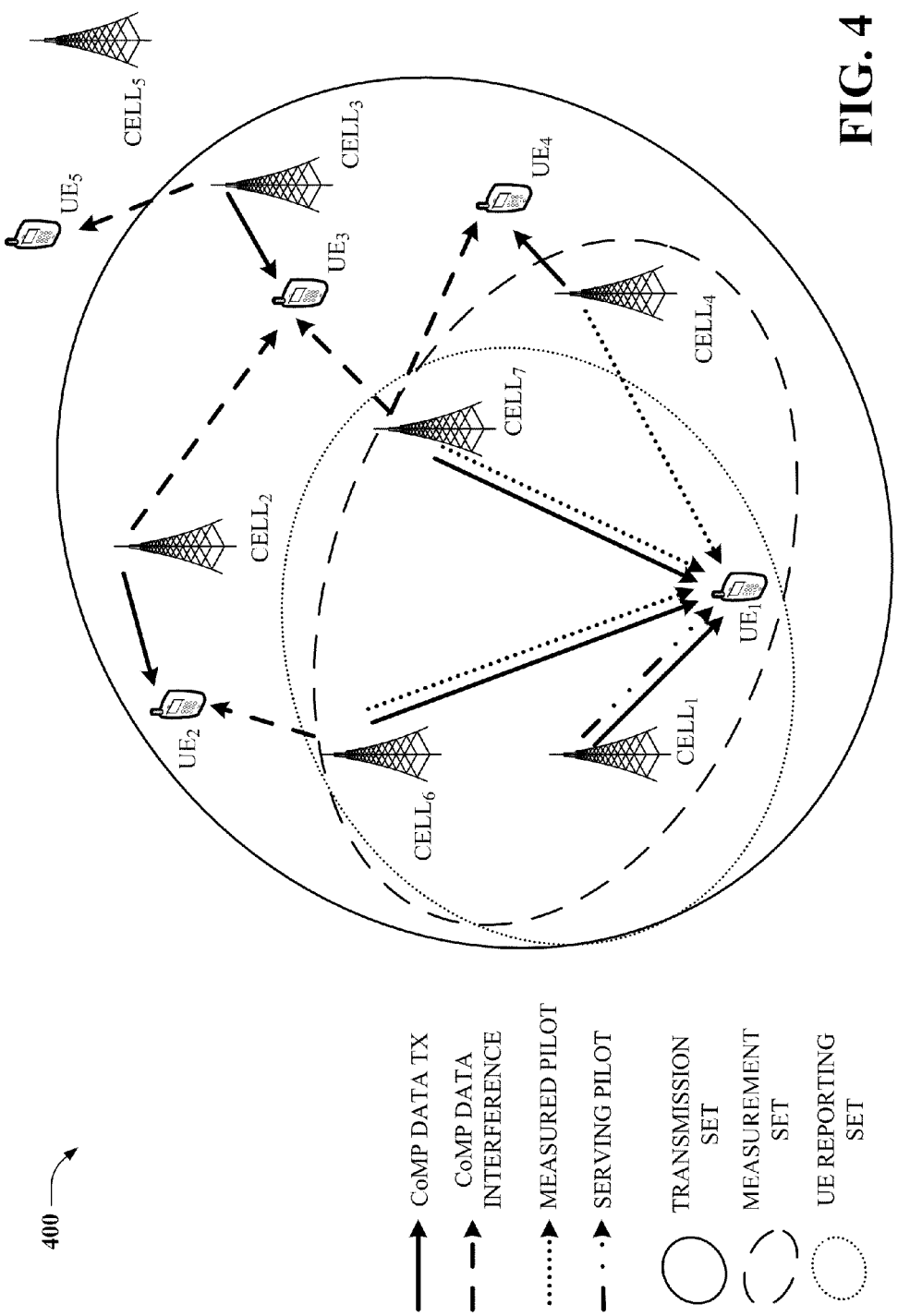
FIG. 4 depicts a diagram of an example wireless environment comprising respective sets of base stations involved in a disclosed MPE framework.

FIG. 4 illustrates a diagram of an example wireless environment 400 comprising a set of wireless cells, and respective association sets of the set of wireless cells pertinent to aspects of the subject disclosure. Particularly, the respective association sets are with respect to $cell_1$ and a CoMP transmission scheduled for $UE_1$ that is served by $cell_1$. A dashed oval encompassing $cell_1$, $cell_4$, $cell_6$ and $cell_7$ indicates a measurement set of cells having respective pilots measured by $UE_1$ (respective dotted arrows between $cells_{6,7,4}$ and $UE_1$) that are above a minimum threshold signal strength, and as defined herein. Further, a dotted oval encompassing $cell_1$, $cell_6$ and $cell_7$ indicates a reporting set of cells associated with $UE_1$. The reporting set of cells are selected for data transmissions (respective solid arrows between $cells_{1,6,7}$ and $UE_1$) directly to $UE_1$ as part of the CoMP transmission. A serving pilot indicated by a dashed pattern arrow between cell$_1$ and UE$_1$ accompanies a data transmission (solid arrow) between cell$_1$ and UE$_1$.

The data transmissions to UE$_1$ result in interference to other UEs (e.g., UE$_2$, UE$_3$ and UE$_4$) neighboring cells$_{6,7}$ in this example wireless environment 400. This interference is depicted by dashed arrows between cell$_6$ and UE$_2$, and between cell$_7$ and UE$_3$ and cell$_7$ and UE$_4$. To mitigate these interfering signals, the CoMP transmission includes mitigation transmissions assigned to cell$_2$ (solid arrow between cell$_2$ and UE$_2$), cell$_4$ (solid arrow between cell$_4$ and UE$_4$), and cell$_3$ (solid arrow between cell$_3$ and UE$_3$) for these UEs. Note that in this case, respective serving cells transmit the respective mitigation transmissions, though the subject disclosure is not so limited. Additionally, the mitigation transmission from cell$_3$ to UE$_3$ also causes interference to UE$_5$ (dashed arrow between cell$_3$ and UE$_5$). This interference can be estimated to be below a threshold interference level, however, and thus no mitigation transmission between cell$_5$ and UE$_5$ is included in the CoMP transmission.

As depicted, CoMP transmission involves both data transmissions to UE$_1$ as well as mitigation transmissions designed to reduce interference to UEs$_{2,3,4}$ as a result of the data transmissions. Accordingly, the CoMP transmission comprises both the data transmissions and the mitigation transmissions. Parameters for these transmissions are calculated by cell$_1$ per an MPE framework as described herein, and distributed to respective cells$_{2,3,4,6,7}$. A transmission set of cells associated with the CoMP transmission therefore comprise all of cells$_{1,2,3,4,6,7}$, as indicated by the solid oval encompassing these cells.

Figure 5:
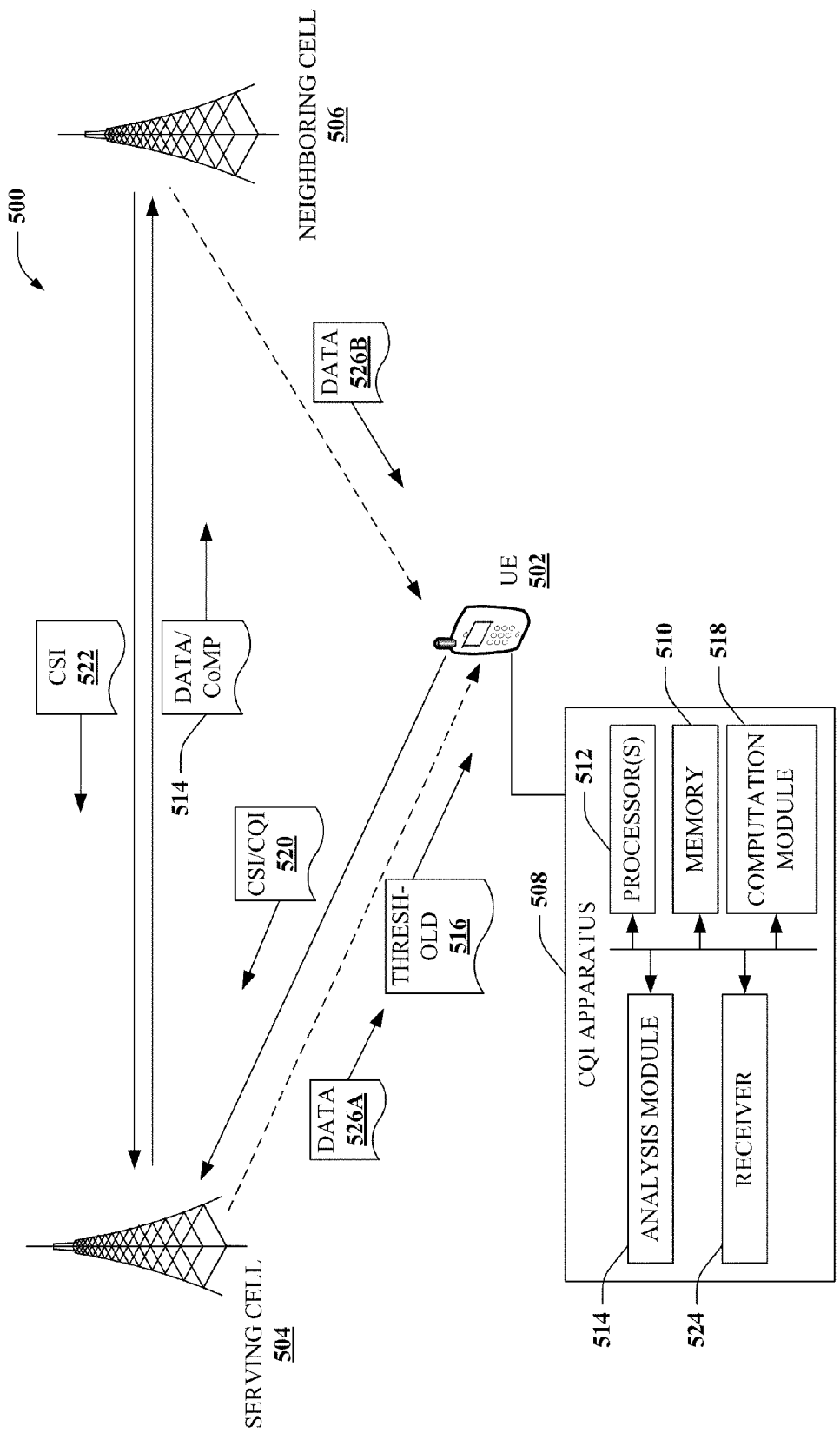
FIG. 5 illustrates a block diagram of a sample wireless communication suitable for CoMP transmission according to further disclosed aspects.

FIG. 5 illustrates a block diagram of a wireless communication environment 500 according to still other aspects of the subject disclosure. Wireless communication environment 500 depicts a CoMP transmission along with related transmissions between a UE 502 scheduled for data transmission from multiple cells, including a serving cell 504 and a neighboring cell 506 (both of which are included in a reporting set and a transmitting set, as defined herein). In addition, UE 502 includes or is coupled with a CQI apparatus 508 that is configured to facilitate channel estimation and channel quality determinations for the CoMP transmission.

Particularly, CQI apparatus 508 can comprise memory 510 for storing instructions to facilitate distributed scheduling for CoMP transmission, and a data processor 512 for executing modules that implement the instructions. Further, these modules can comprise an analysis module 514 that measures received wireless signals from a set of neighboring base stations (neighboring cell 506) and that identifies a set of wireless signals of the received wireless signals that are above a minimum threshold signal strength related to a target C/I level. In one aspect, the minimum threshold signal strength can be provided in a threshold repot 516 from serving cell 504; whereas in other aspects UE 502 can be preconfigured to have the minimum threshold signal strength stored in memory 510, or can receive such signal strength upon first entering a wireless network associated with serving cell 504.

Furthermore, CQI apparatus 508 can comprise a computation module 518 that determines channel state information (CSI) for the set of wireless signals and calculates channel quality information (CQI) from the CSI independent of scheduling decisions of neighboring base station 506. A report 520 of this CSI or CQI is transmitted to serving cell 504, to facilitate transmission scheduling for UE 502 and for other UEs served by serving cell 504 (not depicted).

In various aspects of the subject disclosure, CQI apparatus 508 can further comprise a receiver 524 that obtains a resource allocation assignment and CQI feedback for the CoMP transmission based on the CQI, wherein the resource location assignment or the CQI feedback is determined by serving cell 504 independent of scheduling decisions of neighboring cell 506. In at least one instance, receiver 524 further obtains a rate assignment for the CoMP transmission based at least in part on the CQI, wherein the rate assignment is optionally further based on scheduling decisions of neighboring cell 506, reported to serving cell 504 over a backhaul.

Once scheduling is complete, UE 502 and CQI apparatus 508 receives multiple downlink transmission signals 526A, 526B of the CoMP transmission on a set of wireless channels. In at last one aspect, analysis module 514 can be configured as a module that measures channel gain or residual interference on an aggregate of the set of wireless channels. In this aspect, analysis module 514 submits a metric of channel quality based at least in part on the channel gain or the residual interference to serving cell 504 to facilitate channel quality predictions of a subsequent downlink transmission. For instance, serving cell 504 can employ the metric of channel quality and an estimate of channel gain derived from CSI/CQI submitting be UE 502 to derive a gain offset. The gain offset can be employed to predict short-term channel quality observed by UE 502 for the subsequent downlink transmission.

Figure 6:
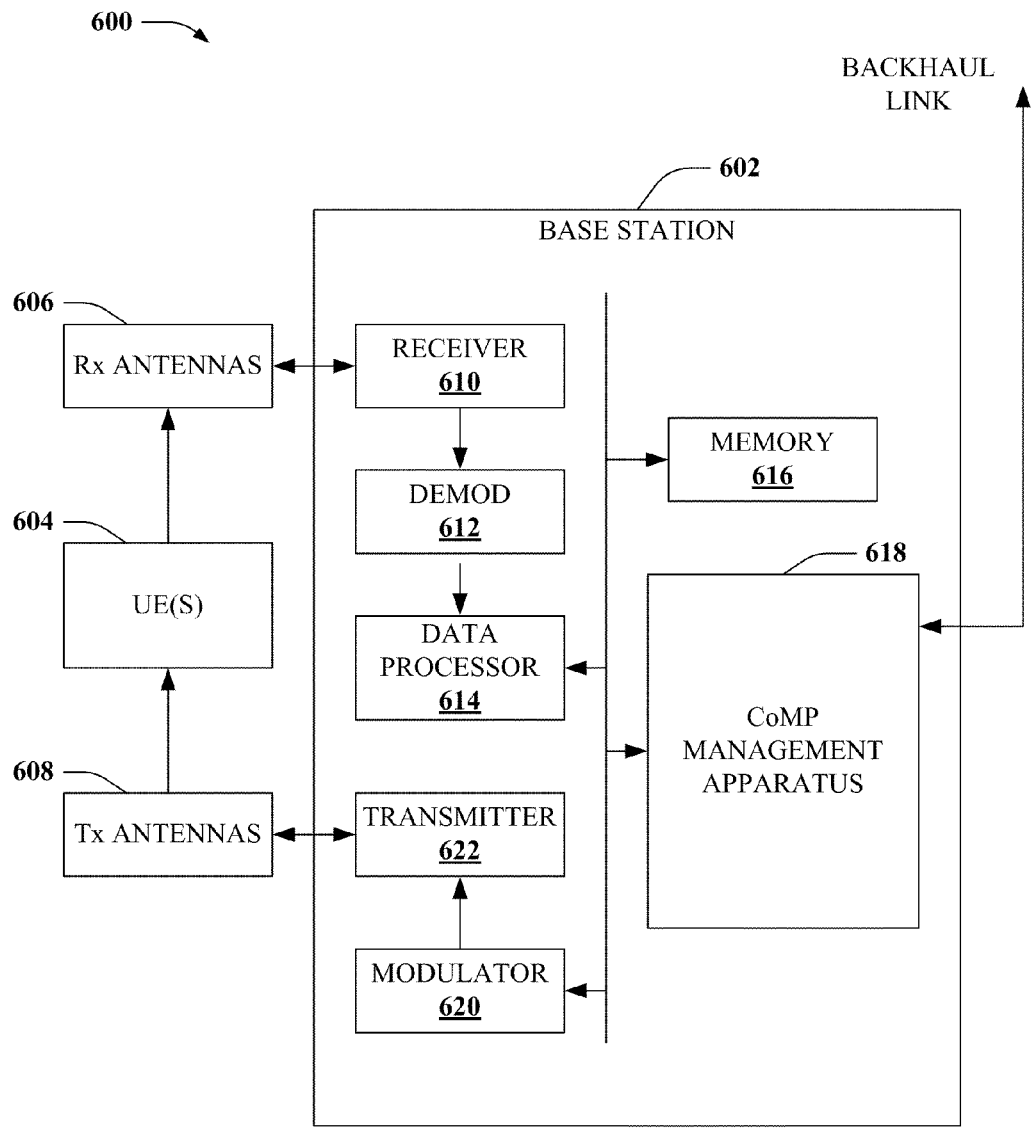
FIG. 6 depicts a block diagram of an example base station configured for managing CoMP wireless communication according to additional aspects.

FIG. 6 illustrates a block diagram of an example system 600 comprising a base station 602 configured for aspects of the subject disclosure. For instance, base station 602 can be configured to implement independent and distributed scheduling and distributed coefficient computation for a CoMP transmission assigned to one or more UEs 604 served by base station 602, or to facilitate such distributed coefficient computation for a CoMP transmission managed by another base station (not depicted). In at least one example, base station 602 is configured to receive a report of CSI pertaining to wireless channels observed by UE(s) 604, and estimate channel quality for those wireless channels. Based on the estimated channel quality, base station 602 can be configured to schedule a data transmission, including allocating resource locations or providing CQI feedback, for one or more of UE(s) 604 independent of scheduling decisions of other base stations. According to another aspect, base station 602 can be configured to receive CSI information based on scheduling decisions of the other base stations over a backhaul link, and calculate respective transmission parameters for the CoMP transmission based thereon. Base station 602 can then forward respective transmission parameters and transmission data to respective base stations participating in the CoMP transmission, as described herein.

Base station 602 (e.g., access point, . . . ) can comprise a receiver 610 that obtains wireless signals from one or more of ATs 604 through one or more receive antennas 606, and a transmitter 630 that sends coded/modulated wireless signals provided by modulator 626 to the AT(s) 604 through a transmit antenna(s) 606. Receiver 610 can obtain information from receive antennas 606 and can further comprise a signal recipient (not shown) that receives uplink data transmitted by AT(s) 604. Additionally, receiver 610 is operatively associated with a demodulator 612 that demodulates received information. Demodulated symbols are analyzed by a data processor 614. Data processor 614 is coupled to a memory 616 that stores information related to functions provided or implemented by base station 602. In one instance, stored information can comprise ICIC protocols for initiating and implementing ICIC between base station 602 and one or more other base stations causing interference to UE(s) 604, as described herein. Further, data processor 614 can execute an CoMP management apparatus 618 to implement functions related to providing a MPE framework for CoMP transmission, as described herein (e.g., see FIGS. 1, 2 and 5, supra).

Figure 7:
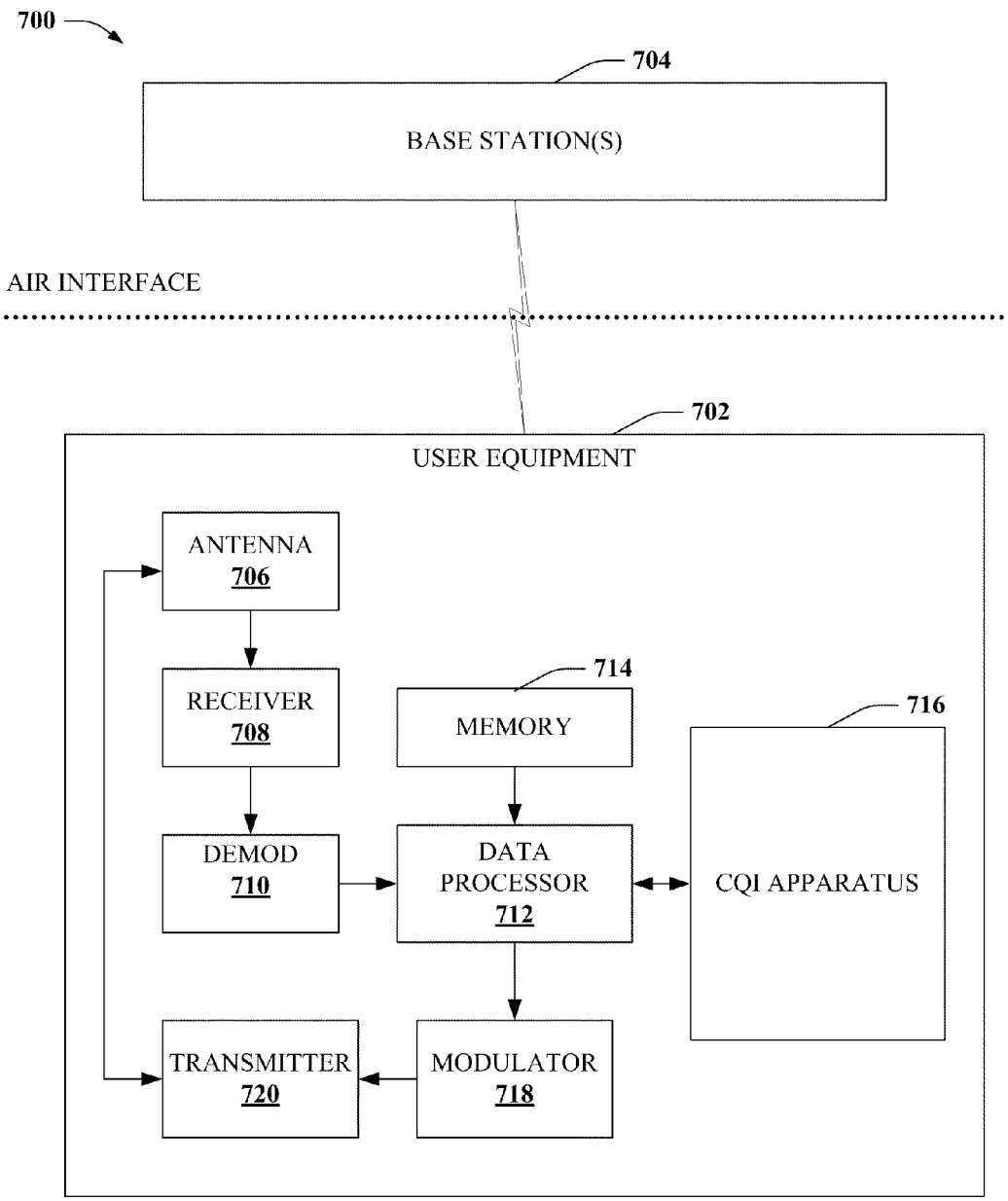
FIG. 7 depicts a block diagram of a sample user equipment for facilitating a disclosed MPE framework for improved CoMP wireless communication.

FIG. 7 illustrates a block diagram of an example wireless communication system 700 comprising a UE 702 according to one or more additional aspects of the subject disclosure. UE 702 can be configured to wirelessly communicate with one or more base stations 704 (e.g., access point(s)) of a wireless network. Based on such configuration, UE 702 can receive wireless signals from base station(s) 704 on one or more forward link channels and respond with wireless signals on one or more reverse link channels. In addition, UE 702 can comprise instructions stored in memory 714 for facilitating distributed and independent transmission scheduling in a CoMP framework, and a data processor 712 to execute an CQI apparatus 716 that implements these instructions, as described herein (e.g., see FIG. 6, supra). Particularly, CQI apparatus 716 can measure channel state information for wireless channels observed by UE 702, and calculate channel quality information for these wireless channels. The channel state information or channel quality information is reported to a serving base station associated with UE 702. In at least one aspect, UE 702 can further report or compute a gain offset based on an aggregate of the wireless channels, and report the gain offset to the serving base station to facilitate improved CoMP transmission involving UE 702, as described herein.

UE 702 includes at least one antenna 706 (e.g., comprising one or more input/output interfaces) that receives a signal and receiver(s) 708, which perform typical actions (e.g., filters, amplifies, down-converts, etc.) on the received signal. In general, antenna 706 and a transmitter 722 (collectively referred to as a transceiver) can be configured to facilitate wireless data exchange with base station(s) 704.

Antenna 706 and receiver(s) 708 can also be coupled with a demodulator 710 that can demodulate received symbols and provide demodulated symbols to a data processor(s) 712 for evaluation. It should be appreciated that data processor(s) 712 can control and/or reference one or more components (antenna 706, receiver 708, demodulator 710, memory 714, limited access apparatus 716, modulator 728, transmitter 730) of UE 702. Further, data processor(s) 712 can execute one or more modules, applications, engines, or the like that comprise information or controls pertinent to executing functions of UE 702.

Additionally, memory 714 of UE 702 is operatively coupled to data processor(s) 712. Memory 714 can store data to be transmitted, received, and the like, and instructions suitable to conduct wireless communication with a remote device (704). In addition, memory 714 can comprise an access protocol 714A employed to perform conventional network access requests to BS(s) 704. Additionally, memory 714 can comprise modified access protocol 714B to obtain limited access for network acquisition, if the convention network access request is rejected by BS(s) 704.

The aforementioned systems have been described with respect to interaction between several components, modules and/or communication interfaces. It should be appreciated that such systems and components/modules/interfaces can include those components/modules or sub-modules specified therein, some of the specified components/modules or sub-modules, and/or additional modules. For example, a system could include serving cell 102 comprising CoMP management apparatus 204, and UE 502 coupled with CQI apparatus 508, or a different combination of these or other entities. Sub-modules could also be implemented as modules communicatively coupled to other modules rather than included within parent modules. Additionally, it should be noted that one or more modules could be combined into a single module providing aggregate functionality. For instance, processing module 218 can include CoMP selection module 220, or vice versa, to facilitate defining a transmission set for CoMP communication and determining transmission coefficients for the CoMP communication, by way of a single module. The modules can also interact with one or more other modules not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 8-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 8:
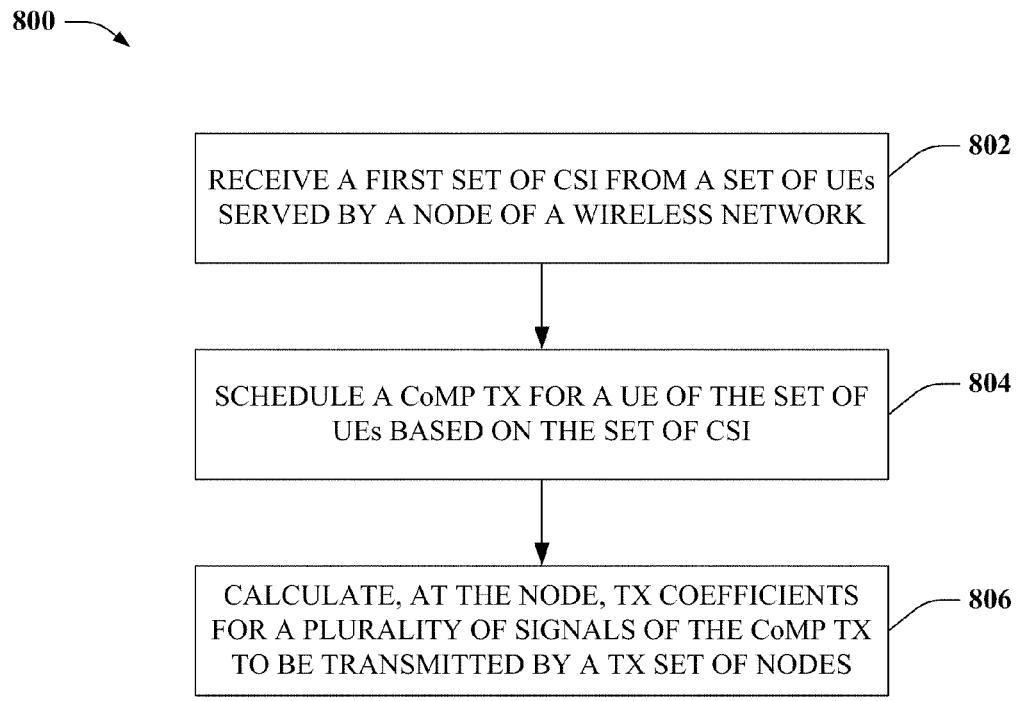
FIG. 8 illustrates a flowchart of an example methodology for implementing CoMP transmissions according to still other disclosed aspects.

FIG. 8 illustrates a flowchart of an example methodology 800 for providing improved gain for CoMP communication according to aspects of the subject disclosure. At 802, method 800 can comprise receiving a first set of CSI from a set of UEs served by a node of a wireless network. Moreover, at 804, method 800 can comprise scheduling a CoMP transmission for a UE of the set of UEs based on the set of CSI. At 806, method 800 can comprise calculating, at the node, transmission coefficients for a plurality of signals of the CoMP transmission to be transmitted by respective nodes of the wireless network (a transmissions set of nodes).

According to various implementations, method 800 can further comprise additional aspects in conjunction with those discussed above. For instance, scheduling the CoMP transmission further comprises employing data measured exclusively within a cell comprising the node, in one instance. Accordingly, the CSI reflects channel conditions between the UE and nodes of the wireless network that are within a reporting set of the UE. More particularly, the reporting set can be a set of nodes that comprises nodes having respective signal strengths above a minimum signal strength threshold as observed by the UE. In one alternative aspect, the number of nodes within the reporting set is capped at a predetermined maximum number selected by the node.

According to further aspects, method 800 can comprise receiving a second set of CSI from a backhaul report set controlled by the node. This backhaul reporting set comprises nodes of the wireless network that serve respective neighboring UEs that will be affected by interference from the plurality of signals of the CoMP transmission, and includes at least the transmission set of nodes. It should be appreciated that these separate signals can comprise data transmissions configured to reach the UE, and data transmissions configured to mitigate interference to one or more of the neighboring UEs. Further according to these aspects, method 800 can comprise employing the second set of CSI or the set of CSI to select the transmission set of nodes out of the backhaul reporting set, and optionally capping the transmission set of nodes at the predetermined maximum number. In another instance, calculating transmission coefficients further comprises employing a MPE coefficient algorithm. The MPE coefficient algorithm can employ various functions to estimate or determine channel quality for UEs within the backhaul reporting set. In one example, the MPE coefficient algorithm can comprise performing computation of the transmission coefficients for nodes within a reporting set of the UE to achieve interference mitigation for the CoMP transmission. In another example, the MPE coefficient algorithm can comprise determining residual interference to the UE resulting from nodes of the wireless network outside of the reporting set, and calculating the transmission coefficients based at least in part on the residual interference. A combination of these or other mechanisms described herein or known in the art can also be employed. However, it at least one aspect, the MPE coefficient algorithm can calculate the transmission coefficients with information obtained from the backhaul reporting set in a single backhaul hop, minimizing backhaul overhead.

According to one specific aspect of the subject disclosure, calculating the transmission coefficients further comprises employing the set of CSI for predicting channel quality gain for the transmission set of nodes. Additionally, the calculating comprises determining a ratio of predicted channel quality gain and actual channel gain reported from a prior MP transmission involving the UE, and deriving a gain offset from the ratio of predicted channel quality and actual channel gain. Moreover, the calculating comprises employing the gain offset at least in part for predicting channel quality for scheduling the CoMP for the UE or for link adaptation functions. These link adaptation functions can include, for instance, bandwidth assignments, data rate assignments, MCS assignments, and the like, for the UE or other UEs served by the node.

In still another aspect of the subject disclosure, method 800 can additionally comprise transmitting respective transmission coefficients for the plurality of signals and data packets for the CoMP transmission to respective nodes in preparation for the CoMP transmission. Further, method 800 can comprise transmitting one of the plurality of signals in accordance with an associated signal coefficient as part of implementing the CoMP transmission. By scheduling the UE based on the set of CSI, including channel quality estimates derived from the CSI based at least in part on a residual interference level, method 800 can mitigate inter-cell coordination for the scheduling. This results in reduced backhaul utilization and reduced delay for scheduling. Moreover, by employing only one backhaul hop for receiving the second set of CSI—which reflects scheduling decisions of the backhaul reporting set of base stations, short-term channel quality throughout the backhaul reporting set can be predicted for the CoMP transmission. Another backhaul hop can deliver respective transmission coefficients, resulting in a maximum of two backhaul hops for the CoMP transmission. This can enable CoMP implementations network-wide, by reducing backhaul overhead and limiting scope of interference to the network (e.g., via mitigation transmissions determined from the short-term channel quality), avoiding significant challenges involved with conventional CoMP network-wide deployments.

Figure 9:
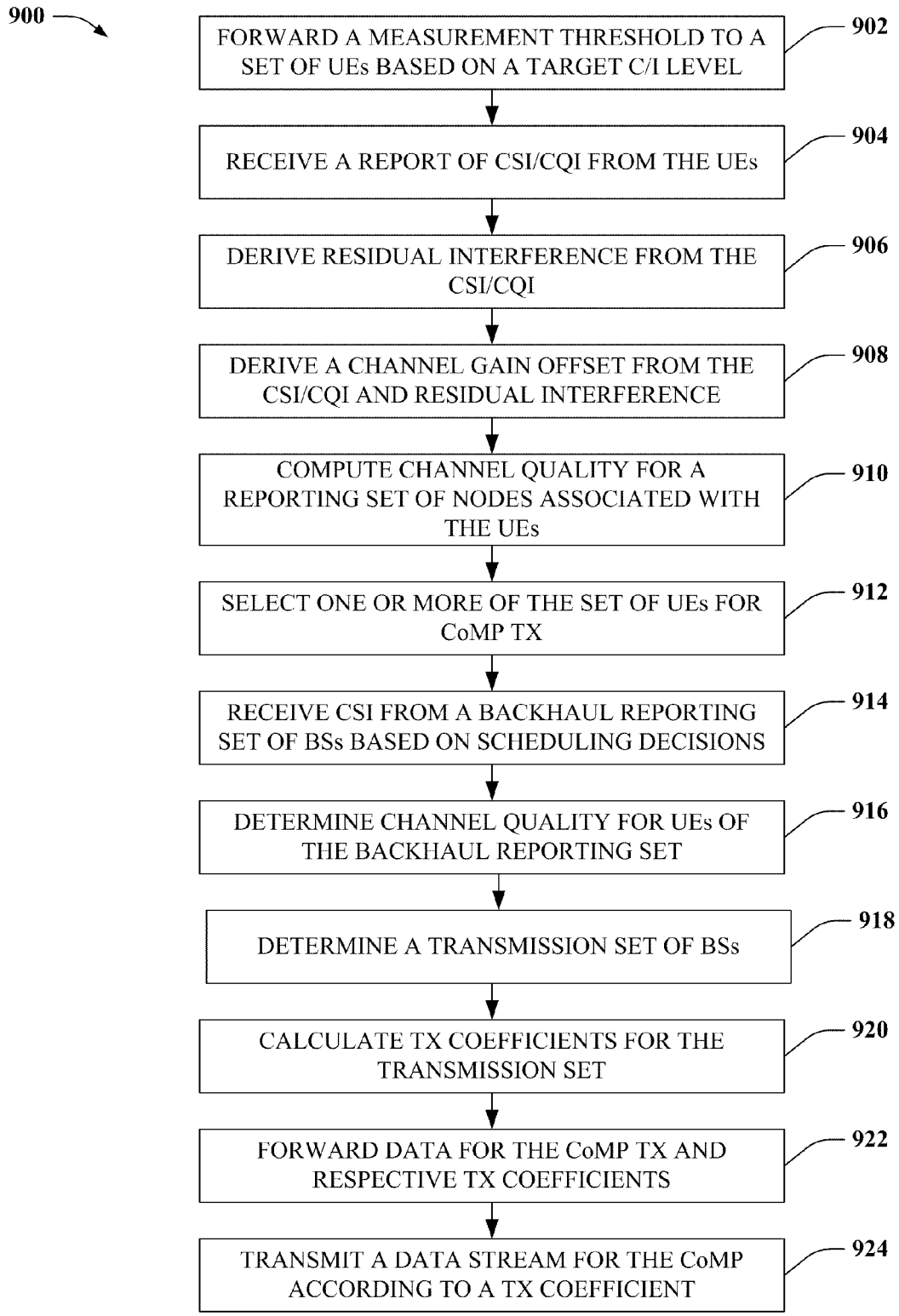
FIG. 9 depicts a flowchart of an example methodology for providing a MPE framework in CoMP transmission according to further aspects.

FIG. 9 illustrates a flowchart of a sample methodology 900 for providing an MPE framework for improved CoMP wireless communication according to further disclosed aspects. At 902, method 900 can comprise forwarding a minimum signal strength threshold to a set of UEs. This minimum signal strength threshold can be based on a target C/I level, and used to define a measurement set of base stations, and at least in part a reporting set of base stations for respective UEs of the set of UEs.

At 904, method 900 can comprise receiving a report of CSI/CQI from respective UEs of the set of UEs. At 906, method 900 can comprise deriving residual interference from the CSI/CQI reports for respective UEs of the set of UEs, and at 908, deriving a channel gain offset for UEs of the set of UEs from the CSI/CQI reports. At 910, method 900 can comprise computing channel quality for respective reporting sets of nodes associated with the respective UEs. Based on the channel quality, method 900 can select one or more of the set of UEs for a CoMP transmission, at 912.

At 914, method 900 can comprise receiving CSI from a backhaul reporting set of base stations that are based on respective scheduling decisions of respective base stations of the backhaul reporting set. Additionally, at 916, method 900 can comprise determining channel quality for UEs of the backhaul reporting set. At 918, method 900 can comprise selecting a transmission set of base stations for the CoMP transmission, and calculate respective transmission coefficients for individual transmissions of the CoMP transmission, based on the channel quality of the backhaul reporting set at 920. At 922, method 900 can comprise forwarding data for the CoMP transmission and respective transmission components to respective base stations of the transmission set. At 924, method 900 can comprise transmitting a data stream for the CoMP according to a transmission coefficient determined for the data stream.

Figure 10:
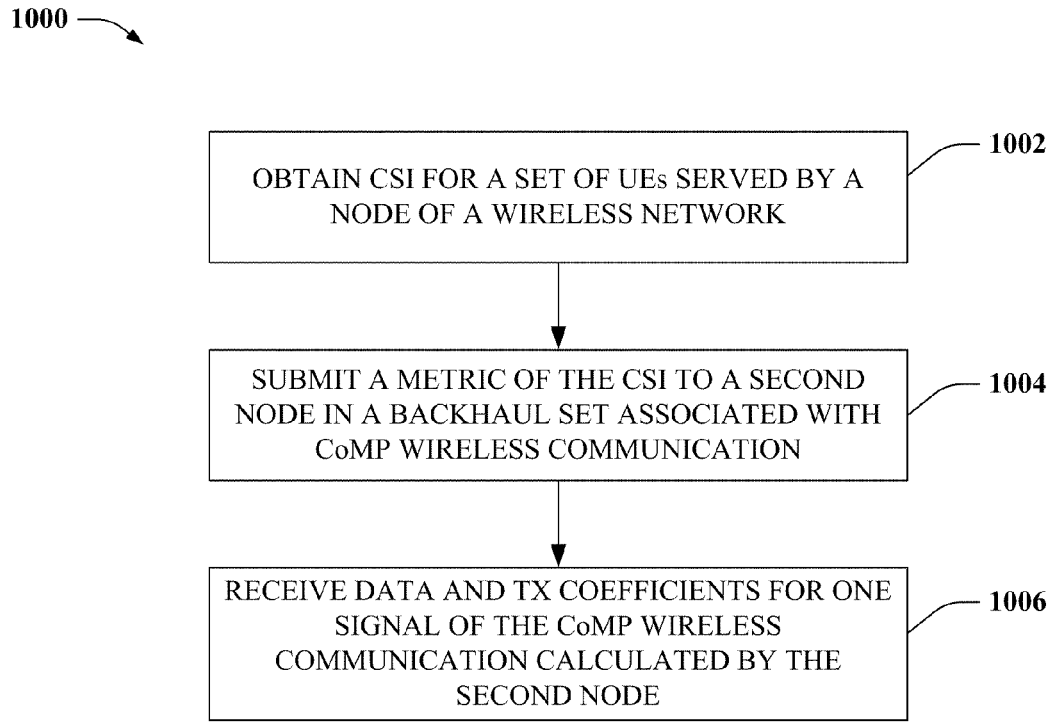
FIG. 10 illustrates a flowchart of a sample methodology for participating in CoMP transmission according to another aspect.

FIG. 10 illustrates a flowchart of a sample methodology 1000 for facilitating an MPE framework for CoMP wireless communication according to additional disclosed aspects. At 1002, method 1000 can comprise obtaining CSI for a set of UEs served by a node of a wireless network. At 1004, method 1000 can comprise submitting a metric of the CSI to a second node of the wireless network, wherein the node and the second node are included within at least one semi-static backhaul reporting set of base stations pertaining to CoMP wireless communication. Particularly, the at least one semi-static backhaul reporting set is controlled by the second node. But in various aspects, at least one second semi-static backhaul reporting set is associated with the node as well. In accordance with these aspects, method 1000 can additionally comprise selecting one of the set of UEs for a second CoMP wireless communication independent of scheduling decisions of other base stations of the backhaul reporting set, or the second backhaul reporting set.

At 1006, method 1000 can comprise receiving data and transmission coefficients for one signal of the CoMP wireless communication, wherein the transmission coefficients are computed by the second node. According to particular aspects, method 1000 can additionally comprise transmitting the data within the one signal in accordance with the transmission coefficients to implement a segment of the CoMP wireless communication. In one instance, the one signal is configured to comprise one of multiple downlink transmissions conveying the data to a UE served by the second node. In an alternative instance, the one signal is configured to mitigate interference to one of the set of UEs resulting from the CoMP wireless communication. This one of the set of UEs can be a UE served by the node, a UE served by the second node, or a UE served by a third node of the wireless network.

According to one or more aspects of the subject disclosure, transmitting the CSI can be implemented in various manners. For instance, transmitting the metric of the CSI further comprises transmitting the metric via a backhaul link coupling the node and the second node in one implementation. In another implementation, the transmitting instead comprises transmitting the metric of the CSI to the second node over-the-air at least in part one of the set of UEs, or via another UE for which the second node is in a reporting set.

Figure 11:
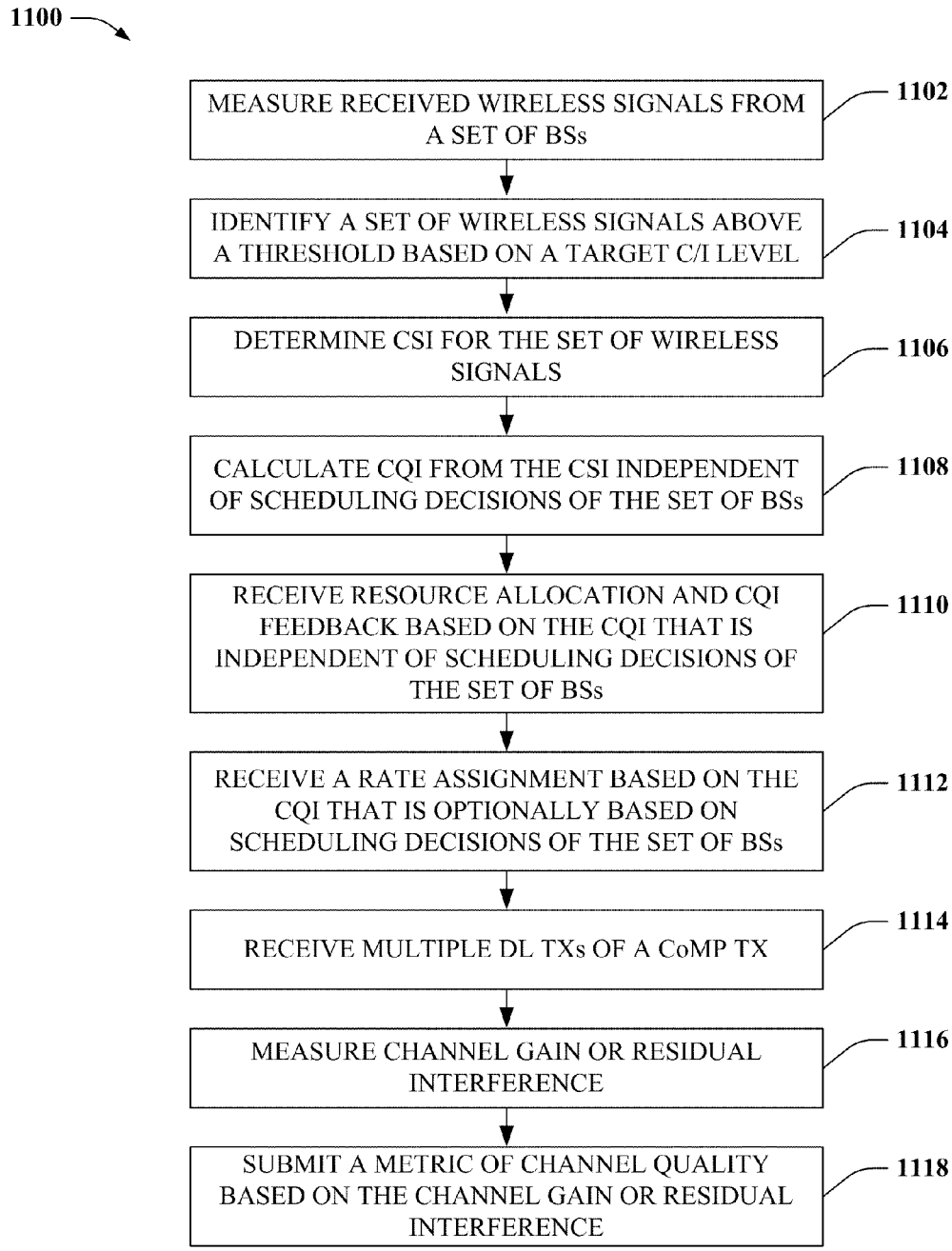
FIG. 11 illustrates a flowchart of an example methodology for facilitating an MPE framework for CoMP wireless communication.

FIG. 11 illustrates a flowchart of a sample methodology 1100 for facilitating CoMP wireless communication according to still further aspects. At 1102, method 1100 can comprise measuring received wireless signals from a set of neighboring base stations. At 1104, method 1100 can comprise identifying a set of wireless signals of the received wireless signals that are above a minimum threshold signal strength that is related to a target C/I level. At 1106, method 1100 can comprise determining CSI for the set of wireless channels, and at 1108, calculating CQI from the CSI independent of scheduling decisions of the set of neighboring base stations.

At 1110, method 1100 can additionally comprise receiving a resource allocation assignment and CQI feedback for a CoMP transmission based on the CQI, wherein the resource location assignment or the CQI feedback is determined independent of scheduling decisions of the set of neighboring base stations. Furthermore, at 1112, method 1100 can comprise receiving a rate assignment for the CoMP transmission based at least in part on the CQI, wherein the rate assignment is optionally further based on scheduling decisions of the set of neighboring base stations. At 1114, method 1100 can comprise receiving multiple downlink transmission signals of the CoMP transmission on the set of wireless channels. Further, at 1116, method 1100 can comprise measuring channel gain or residual interference for an aggregate of the multiple downlink transmissions. At 1118, method 1100 can comprise submitting a metric of channel quality based at least in part on the channel gain or the residual interference to a serving base station to facilitate channel quality predictions for a subsequent downlink transmission.

Figure 12:
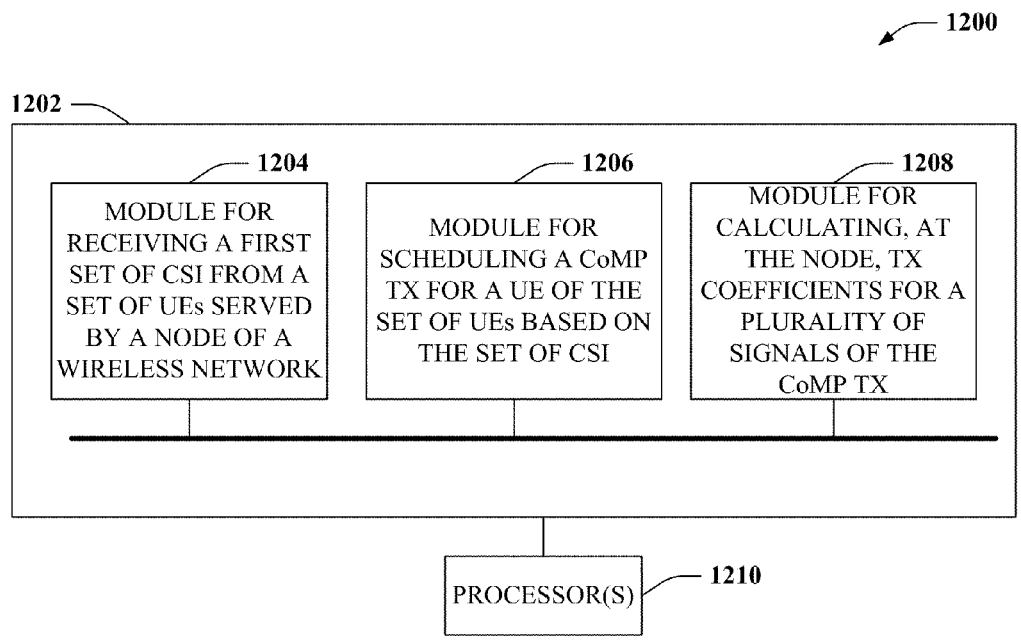
FIG. 12 depicts a block diagram of a sample apparatus that implements an MPE framework for CoMP wireless communication.
Figure 13:
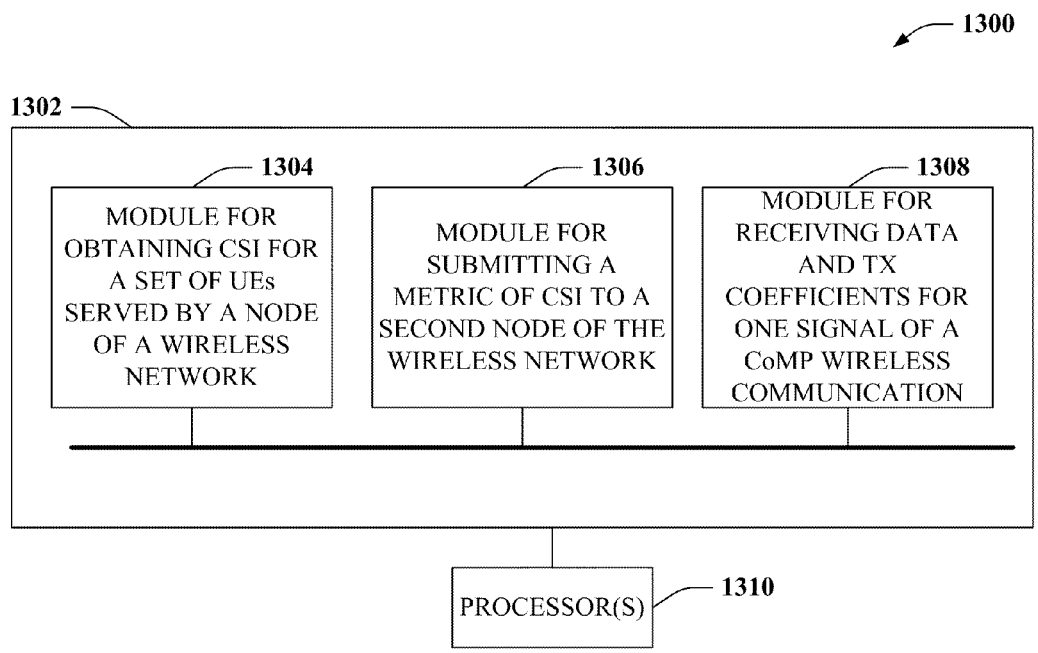
FIG. 13 illustrates a block diagram of an example apparatus for participating in CoMP transmissions.
Figure 14:
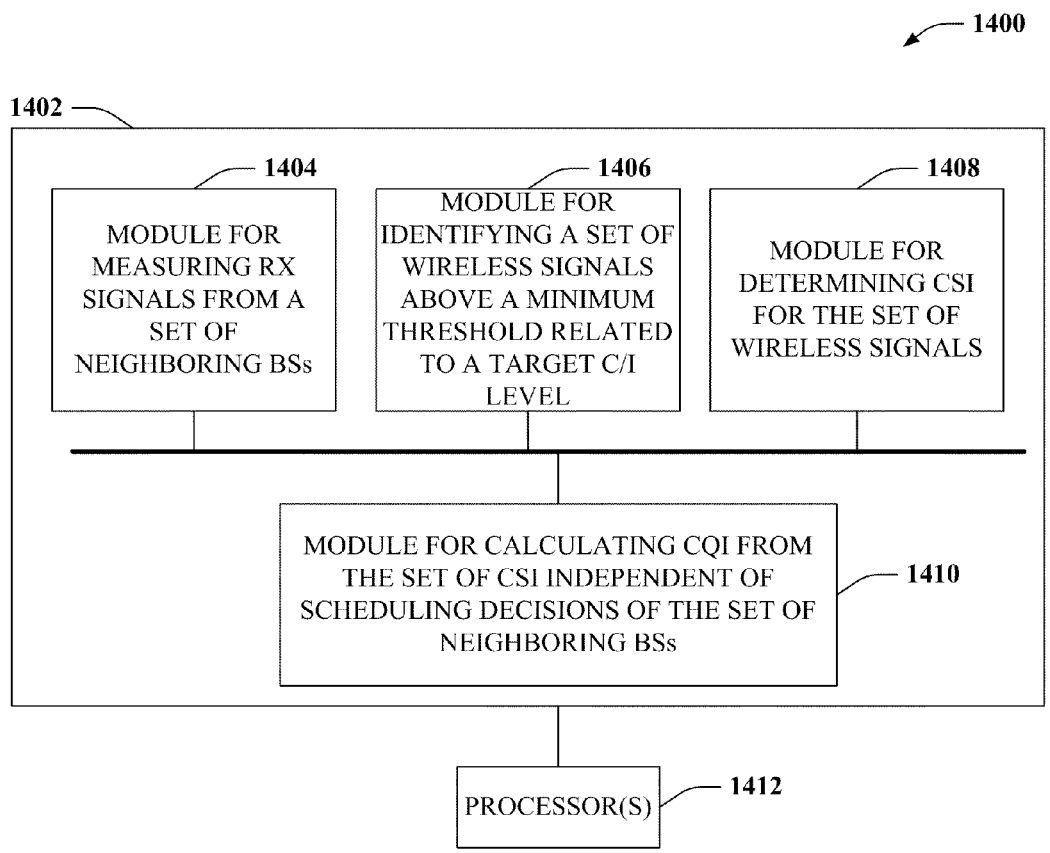
FIG. 14 illustrates a block diagram of an example apparatus for facilitating CoMP communication according to particular disclosed aspects.

FIGS. 12, 13 and 14 illustrate respective example apparatuses 1200, 1300, 1400 for implementing improved acknowledgment and re-transmission protocols for wireless communication according to aspects of the subject disclosure. For instance, apparatuses 1200, 1300, 1400 can reside at least partially within a wireless communication network and/or within a wireless receiver such as a node, base station, access point, user terminal, personal computer coupled with a mobile interface card, or the like. It is to be appreciated that apparatuses 1200, 1300, 1400 are represented as including functional blocks, which can be functional blocks that represent functions implemented by a processor, software, or combination thereof (e.g., firmware).

Apparatus 1200 can comprise memory 1202 for storing modules or instructions configured to execute functions of apparatus 1200, including employing an MPE framework for CoMP communication, and a data processor 1210 for executing modules that implement these functions. Apparatus 1200 can additionally comprise a module 1204 for receiving a first set of CSI from a set of UEs served by a node of a wireless network. Apparatus 1200 can further comprise a module 1206 for scheduling a CoMP transmission for a UE of the set of UEs based on the set of CSI. Moreover, apparatus 1200 can comprise a module 1208 for calculating, at the node, transmission coefficients for a plurality of signals of the CoMP transmission to be transmitted by respective nodes of the wireless network.

Apparatus 1300 can comprise memory 1302 for storing modules or instructions configured to execute functions of apparatus 1300, including facilitating distributed coefficient computation for CoMP transmissions, and a data processor 1310 for executing modules that implement these functions. Apparatus 1300 can further comprise a module 1304 for obtaining CSI for a set of UEs served by a node of a wireless network. In addition, apparatus 1300 can comprise a module 1306 for submitting a metric of the CSI to a second node of the wireless network, wherein the node and the second node are included within at least one semi-static backhaul reporting set of base stations pertaining to CoMP wireless communication. Furthermore, apparatus 1300 can also comprise a module 1308 for receiving data and transmission coefficients for one signal of the CoMP wireless communication, wherein the transmission coefficients are computed by the second node.

Apparatus 1400 comprises memory 1402 for storing instructions or modules configured to facilitate distributed and independent scheduling for CoMP wireless communication according to particular disclosed aspects, and a data processor 1412 for executing the modules or instructions. As depicted, apparatus 1400 can comprise a module 1404 for measuring received wireless signals from a set of neighboring base stations. Further, apparatus 1400 can comprise a module 1406 for identifying a set of wireless signals of the received wireless signals that are above a minimum threshold signal strength that is related to a target carrier to residual interference level, and a module 1408 for determining CSI for the set of wireless signals. Moreover, in at least one further aspect, apparatus 1400 can comprise a module 1410 for calculating CQI from the CSI independent of scheduling decisions of the set of neighboring base stations.

Figure 15:
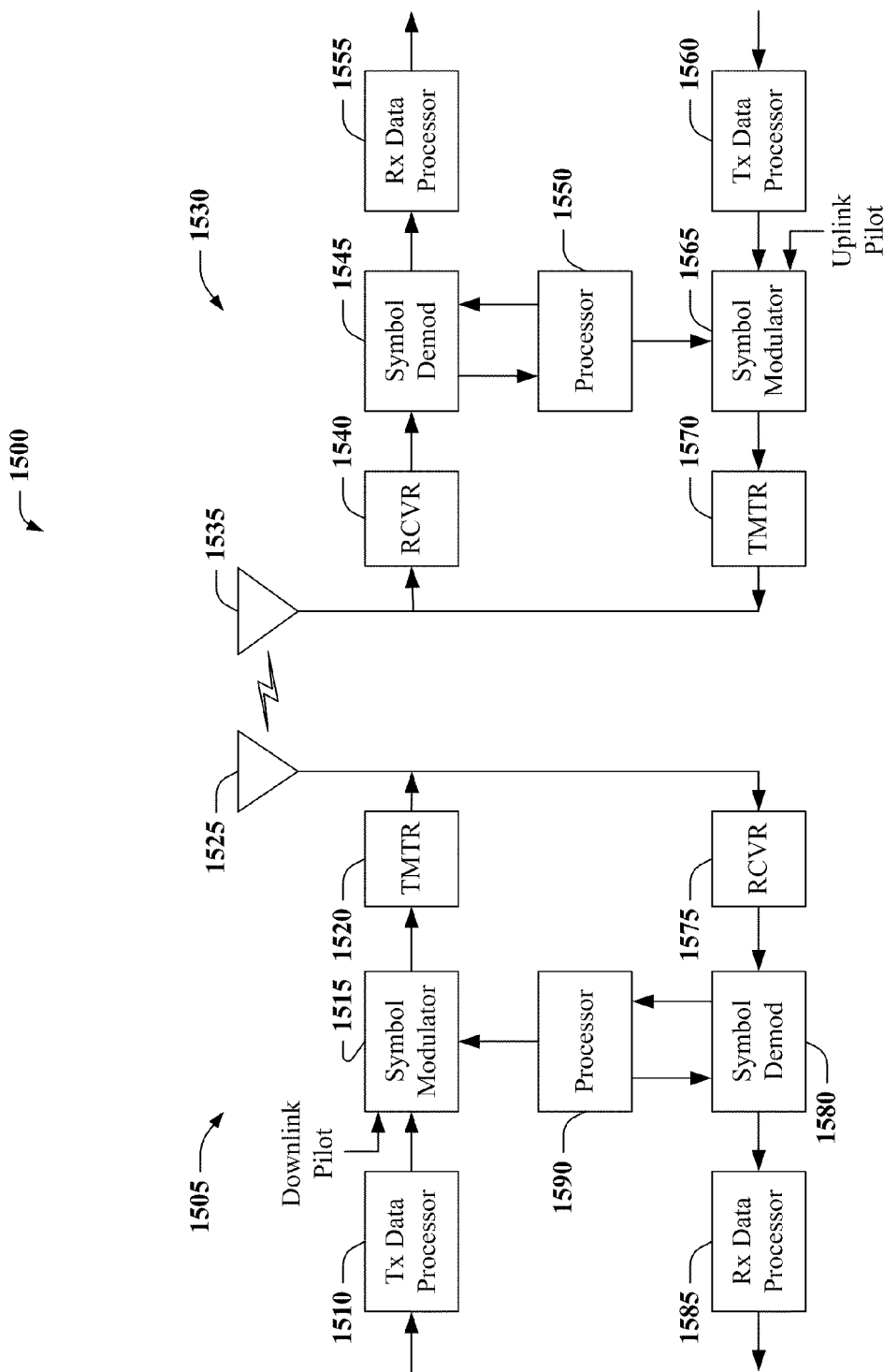
FIG. 15 illustrates a block diagram of an example wireless transmit-receive chain facilitating wireless communication according to some disclosed aspects.

FIG. 15 depicts a block diagram of an example system 1500 that can facilitate wireless communication according to some aspects disclosed herein. On a DL, at access point 1505, a transmit (TX) data processor 1510 receives, formats, codes, interleaves, and modulates (or symbol maps) traffic data and provides modulation symbols ("data symbols"). A symbol modulator 1515 receives and processes the data symbols and pilot symbols and provides a stream of symbols. A symbol modulator 1515 multiplexes data and pilot symbols and provides them to a transmitter unit (TMTR) 1520. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1520 receives and converts the stream of symbols into one or more analog signals and further conditions (e.g., amplifies, filters, and frequency upconverts) the analog signals to generate a DL signal suitable for transmission over the wireless channel. The DL signal is then transmitted through an antenna 1525 to the terminals. At terminal 1530, an antenna 1535 receives the DL signal and provides a received signal to a receiver unit (RCVR) 1540. Receiver unit 1540 conditions (e.g., filters, amplifies, and frequency downconverts) the received signal and digitizes the conditioned signal to obtain samples. A symbol demodulator 1545 demodulates and provides received pilot symbols to a processor 1550 for channel estimation. Symbol demodulator 1545 further receives a frequency response estimate for the DL from processor 1550, performs data demodulation on the received data symbols to obtain data symbol estimates (which are estimates of the transmitted data symbols), and provides the data symbol estimates to an RX data processor 1555, which demodulates (i.e., symbol demaps), deinterleaves, and decodes the data symbol estimates to recover the transmitted traffic data. The processing by symbol demodulator 1545 and RX data processor 1555 is complementary to the processing by symbol modulator 1515 and TX data processor 1510, respectively, at access point 1505.

On the UL, a TX data processor 1560 processes traffic data and provides data symbols. A symbol modulator 1565 receives and multiplexes the data symbols with pilot symbols, performs modulation, and provides a stream of symbols. A transmitter unit 1570 then receives and processes the stream of symbols to generate an UL signal, which is transmitted by the antenna 1535 to the access point 1505. Specifically, the UL signal can be in accordance with SC-FDMA requirements and can include frequency hopping mechanisms as described herein.

At access point 1505, the UL signal from terminal 1530 is received by the antenna 1525 and processed by a receiver unit 1575 to obtain samples. A symbol demodulator 1580 then processes the samples and provides received pilot symbols and data symbol estimates for the UL. An RX data processor 1585 processes the data symbol estimates to recover the traffic data transmitted by terminal 1530. A processor 1590 performs channel estimation for each active terminal transmitting on the UL. Multiple terminals can transmit pilot concurrently on the UL on their respective assigned sets of pilot sub-bands, where the pilot sub-band sets can be interlaced.

Processors 1590 and 1550 direct (e.g., control, coordinate, manage, etc.) operation at access point 1505 and terminal 1530, respectively. Respective processors 1590 and 1550 can be associated with memory units (not shown) that store program codes and data. Processors 1590 and 1550 can also perform computations to derive frequency and time-based impulse response estimates for the UL and DL, respectively.

For a multiple-access system (e.g., SC-FDMA, FDMA, OFDMA, CDMA, TDMA, etc.), multiple terminals can transmit concurrently on the UL. For such a system, the pilot sub-bands can be shared among different terminals. The channel estimation techniques can be used in cases where the pilot sub-bands for each terminal span the entire operating band (possibly except for the band edges). Such a pilot sub-band structure would be desirable to obtain frequency diversity for each terminal.

The techniques described herein can be implemented by various means. For example, these techniques can be implemented in hardware, software, or a combination thereof. For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1590 and 1550.

Figure 16:
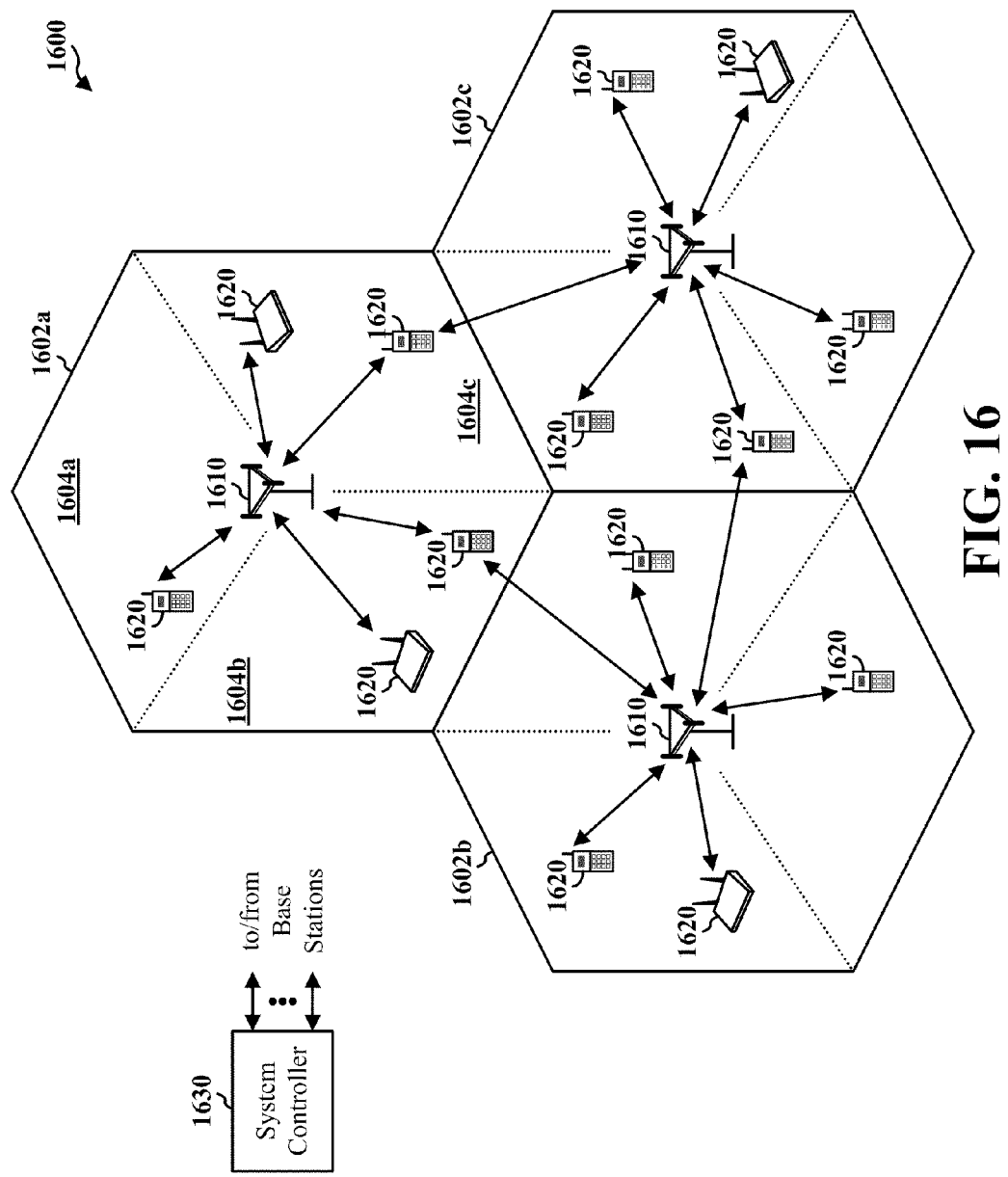
FIG. 16 illustrates a block diagram of an example wireless communication system for various aspects of the subject disclosure.

FIG. 16 illustrates a wireless communication system 1600 with multiple base stations (BSs) 1610 (e.g., wireless access points, wireless communication apparatus) and multiple terminals 1620 (e.g., ATs), such as can be utilized in conjunction with one or more aspects. A BS 1610 is generally a fixed station that communicates with the terminals and can also be called an access point, a Node B, or some other terminology. Each BS 1610 provides communication coverage for a particular geographic area or coverage area, illustrated as three geographic areas in FIG. 16, labeled 1602a, 1602b, and 1602c. The term "cell" can refer to a BS or its coverage area depending on the context in which the term is used. To improve system capacity, a BS geographic area/coverage area can be partitioned into multiple smaller areas (e.g., three smaller areas, according to cell 1602a in FIG. 16), 1604a, 1604b, and 1604c. Each smaller area (1604a, 1604b, 1604c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1620 are typically dispersed throughout the system, and each terminal 1620 can be fixed or mobile. Terminals 1620 can also be called a mobile station, user equipment, a user device, wireless communication apparatus, an access terminal, a user terminal or some other terminology. A terminal 1620 can be a wireless device, a cellular phone, a personal digital assistant (PDA), a wireless modem card, and so on. Each terminal 1620 can communicate with zero, one, or multiple BSs 1610 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1630 couples to base stations 1610 and provides coordination and control for BSs 1610. For a distributed architecture, BSs 1610 can communicate with one another as needed (e.g., by way of a wired or wireless backhaul network communicatively coupling the BSs 1610). Data transmission on the forward link often occurs from one access point to one access terminal at or near the maximum data rate that can be supported by the forward link or the communication system. Additional channels of the forward link (e.g., control channel) can be transmitted from multiple access points to one access terminal. Reverse link data communication can occur from one access terminal to one or more access points.

Figure 17:
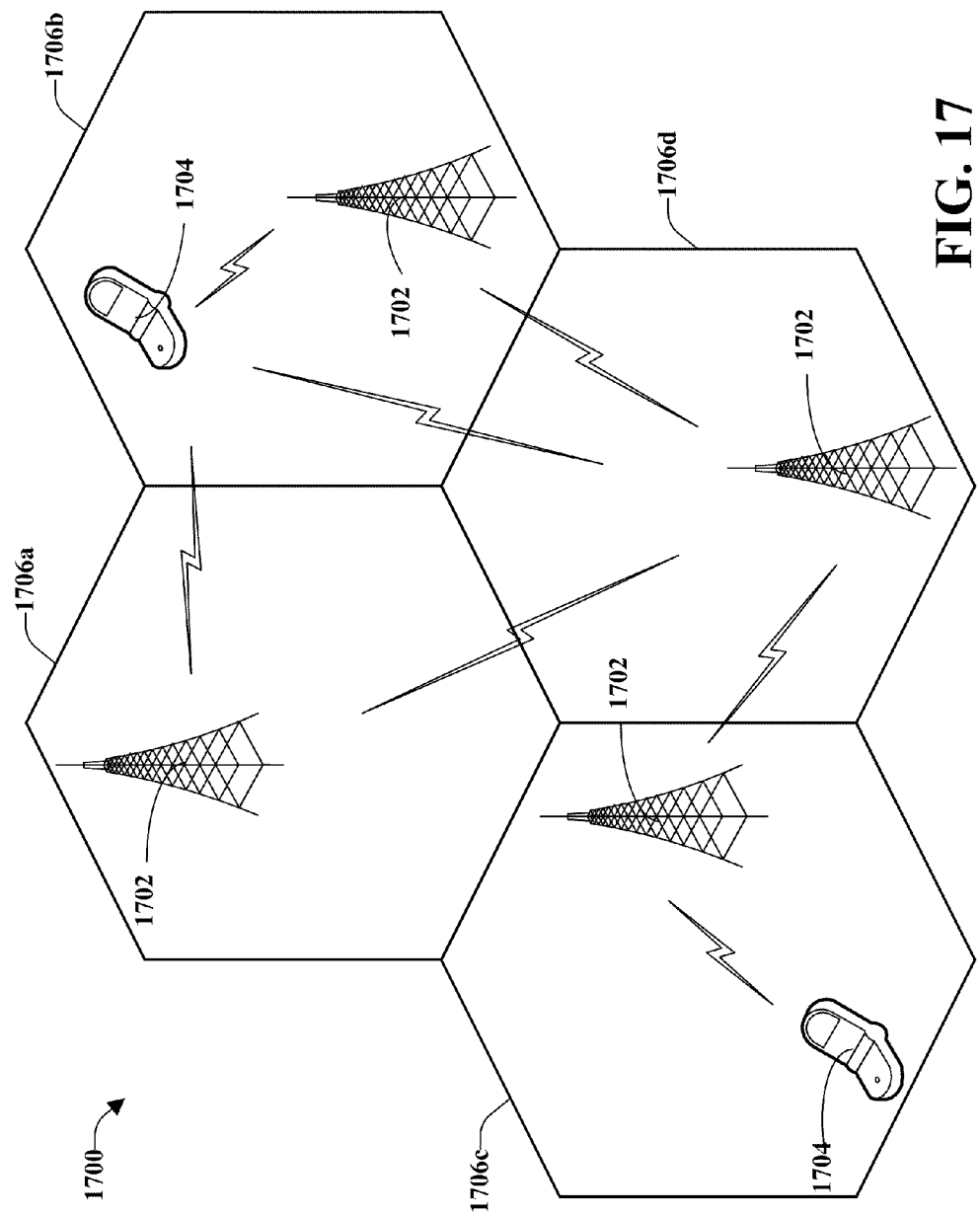
FIG. 17 depicts a block diagram of an example cell-based wireless communication arrangement suitable for one or more disclosed aspects.

FIG. 17 is an illustration of a planned or semi-planned wireless communication environment 1700, in accordance with various aspects. Wireless communication environment 1700 can comprise one or more BSs 1702 in one or more cells and/or sectors that receive, transmit, repeat, etc., wireless communication signals to each other and/or to one or more mobile devices 1704. As illustrated, each BS 1702 can provide communication coverage for a particular geographic area, illustrated as four geographic areas, labeled 1706a, 1706b, 1706c and 1706d. Each BS 1702 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 12, supra), as will be appreciated by one skilled in the art. Mobile devices 1704 can be, for example, cellular phones, smart phones, laptops, handheld communication devices, handheld computing devices, satellite radios, global positioning systems, PDAs, or any other suitable device for communicating over wireless communication environment 1700. Wireless communication environment 1700 can be employed in conjunction with various aspects described herein in order to facilitate multi-node relay assignment and cell-splitting effects in wireless communication, as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g., data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UE. A UE can also be called a system, a subscriber unit, a subscriber station, mobile station, mobile, mobile communication device, mobile device, remote station, remote terminal, AT, user agent (UA), a user device, or user terminal (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for wireless communication, comprising:
   receiving, at a node of a wireless network, a first set of channel state information (CSI) from a set of user equipments (UEs) served by the node, the first set of CSI comprising information related to channel conditions between a UE of the set of UEs and nodes of the wireless network that are within a reporting set of the UE, the reporting set comprising nodes having respective signal strengths, as observed by the UE, above a minimum signal strength threshold;
   scheduling, by the node independently of scheduling decisions of a backhaul reporting set of nodes, a coordinated multipoint (CoMP) transmission for the UE based on the first set of CSI, the backhaul reporting set comprising nodes of the wireless network that serve UEs expected to observe interference as a result of the scheduled CoMP transmission for the UE;
   receiving, by the node after scheduling the CoMP transmission for the UE, a second set of CSI from the backhaul reporting set based on scheduling decisions of nodes of the backhaul reporting set;
   determining, by the node, a transmission set of nodes of the wireless network for the scheduled CoMP transmission based at least in part on the second set of CSI;
   calculating, at the node, transmission coefficients for a plurality of signals of the CoMP transmission to be transmitted by respective nodes of the transmission set; and
   sending the transmission coefficients to the respective nodes of the transmission set of nodes for use by the respective nodes in the CoMP transmission.

2. The method of claim 1, wherein the scheduling of the CoMP transmission comprises employing CSI measured exclusively within a cell comprising the node.

3. The method of claim 1, wherein a number of nodes within the reporting set is capped at a predetermined maximum number.

4. The method of claim 1, wherein the backhaul reporting set comprises nodes of the wireless network that serve respective neighboring UEs that will be affected by interference from the plurality of signals of the CoMP transmission, and includes the transmission set of nodes.

5. The method of claim 4, wherein the plurality of signals of the CoMP transmission comprise data transmissions configured to reach the UE and data transmissions configured to mitigate interference to one or more of the neighboring UEs.

6. The method of claim 1, further comprising employing the second set of CSI or the first set of CSI to select the transmission set of nodes out of the backhaul reporting set, and optionally capping the transmission set of nodes at a predetermined maximum number.

7. The method of claim 1, wherein calculating the transmission coefficients further comprises at least one of:
   performing computation of the transmission coefficients for nodes within the reporting set to achieve interference mitigation for the CoMP transmission; or
   determining residual interference to the UE resulting from nodes of the wireless network outside of the reporting set, and calculating the transmission coefficients based at least in part on the residual interference.

8. The method of claim 1, wherein calculating the transmission coefficients further comprises:
   employing the first set of CSI for predicting channel gain for the transmission set of nodes;
   determining a ratio of predicted channel gain and actual channel gain reported from a prior CoMP transmission involving the UE;
   deriving a gain offset from the ratio of predicted channel gain and actual channel gain; and
   employing the gain offset at least in part for at least one of predicting channel quality or link adaptation for the scheduled CoMP transmission for the UE.

9. The method of claim 1, further comprising:
   sending data packets for the CoMP transmission to the transmission set of nodes in preparation for the CoMP transmission; and
   transmitting one of the plurality of signals in accordance with an associated signal coefficient as part of implementing the CoMP transmission.

10. An apparatus for wireless communication, comprising:
    means for receiving, at a node of a wireless network, a first set of channel state information (CSI) from a set of user equipments (UEs) served by the node, the first set of CSI comprising information related to channel conditions between a UE of the set of UEs and nodes of the wireless network that are within a reporting set of the UE, the reporting set comprising nodes having respective signal strengths, as observed by the UE, above a minimum signal strength threshold;
    means for scheduling, by the node independently of scheduling decisions of a backhaul reporting set of nodes, a coordinated multipoint (CoMP) transmission for the UE based on the first set of CSI, the backhaul reporting set comprising nodes of the wireless network that serve UEs expected to observe interference as a result of the scheduled CoMP transmission for the UE;
    means for receiving, by the node after scheduling the CoMP transmission for the UE, a second set of CSI from the backhaul reporting set based on scheduling decisions of nodes of the backhaul reporting set;
    means for determining, by the node, a transmission set of nodes of the wireless network for the scheduled CoMP transmission based at least in part on the second set of CSI;
    means for calculating, at the node, transmission coefficients for a plurality of signals of the CoMP transmission to be transmitted by respective nodes of the transmission set; and
    means for sending the transmission coefficients to the respective nodes of the transmission set of nodes for use by the respective nodes in the CoMP transmission.

11. The apparatus of claim 10, wherein the means for scheduling of the CoMP transmission comprises means for employing CSI measured exclusively within a cell comprising the node.

12. The apparatus of claim 10, wherein a number of nodes within the reporting set is capped at a predetermined maximum number.

13. The apparatus of claim 10, wherein the backhaul reporting set comprises nodes of the wireless network that serve respective neighboring UEs that will be affected by interference from the plurality of signals of the CoMP transmission, and includes the transmission set of nodes.

14. The apparatus of claim 13, wherein the plurality of signals of the CoMP transmission comprise data transmissions configured to reach the UE and data transmissions configured to mitigate interference to one or more of the neighboring UEs.

15. The apparatus of claim 10, further comprising means for employing the second set of CSI or the first set of CSI to select the transmission set of nodes out of the backhaul reporting set, and optionally capping the transmission set of nodes at a predetermined maximum number.

16. The apparatus of claim 10, wherein the means for calculating the transmission coefficients further comprises at least one of:
means for performing computation of the transmission coefficients for nodes within the reporting set to achieve interference mitigation for the CoMP transmission; or
means for determining residual interference to the UE resulting from nodes of the wireless network outside of the reporting set, and calculating the transmission coefficients based at least in part on the residual interference.

17. The apparatus of claim 10, wherein means for calculating the transmission coefficients further comprises:
means for employing the first set of CSI for predicting channel gain for the transmission set of nodes;
means for determining a ratio of predicted channel gain and actual channel gain reported from a prior CoMP transmission involving the UE;
means for deriving a gain offset from the ratio of predicted channel gain and actual channel gain; and
means for employing the gain offset at least in part for at least one of predicting channel quality or link adaptation for the scheduled CoMP transmission for the UE.

18. The apparatus of claim 10, further comprising:
means for sending data packets for the CoMP transmission to the transmission set of nodes in preparation for the CoMP transmission; and
means for transmitting one of the plurality of signals in accordance with an associated signal coefficient as part of implementing the CoMP transmission.

19. At least one processor configured for wireless communication, comprising:
a first module that receives, at a node of a wireless network, a first set of channel state information (CSI) from a set of user equipments (UEs) served by the node, the first set of CSI comprising information related to channel conditions between a UE of the set of UEs and nodes of the wireless network that are within a reporting set of the UE, the reporting set comprising nodes having respective signal strengths, as observed by the UE, above a minimum signal strength threshold;
a second module that schedules, by the node independently of scheduling decisions of a backhaul reporting set of nodes, a coordinated multipoint (CoMP) transmission for the UE based on the first set of CSI, the backhaul reporting set comprising nodes of the wireless network that serve UEs expected to observe interference as a result of the scheduled CoMP transmission for the UE;
a third module that receives, by the node after scheduling the CoMP transmission for the UE, a second set of CSI from the backhaul reporting set based on scheduling decisions of nodes of the backhaul reporting set;
a fourth module that determines, at the node, a transmission set of nodes of the wireless network for the scheduled CoMP transmission based at least in part on the second set of CSI;
a fifth module that calculates, at the node, transmission coefficients for a plurality of signals of the CoMP transmission to be transmitted by respective nodes of the transmission set; and
a sixth module that sends the transmission coefficients to the respective nodes of the transmission set of nodes for use by the respective nodes in the scheduled CoMP transmission.

20. The at least one processor of claim 19, wherein the scheduling of the CoMP transmission by the second module comprises employing CSI measured exclusively within a cell comprising the node.

21. The at least one processor of claim 19, wherein a number of nodes within the reporting set is capped at a predetermined maximum number.

22. The at least one processor of claim 19, wherein the backhaul reporting set comprises nodes of the wireless network that serve respective neighboring UEs that will be affected by interference from the plurality of signals of the CoMP transmission, and includes the transmission set of nodes.

23. The at least one processor of claim 22, wherein the plurality of signals of the CoMP transmission comprise data transmissions configured to reach the UE and data transmissions configured to mitigate interference to one or more of the neighboring UEs.

24. The at least one processor of claim 19, further comprising a seventh module that employs the second set of CSI or the first set of CSI to select the transmission set of nodes out of the backhaul reporting set, and optionally capping the transmission set of nodes at a predetermined maximum number.

25. The at least one processor of claim 19, wherein the fifth module that calculates the transmission coefficients comprises at least one of:
a seventh module that performs computation of the transmission coefficients for nodes within the reporting set to achieve interference mitigation for the CoMP transmission; or
an eighth module that determines residual interference to the UE resulting from nodes of the wireless network outside of the reporting set, and calculating the transmission coefficients based at least in part on the residual interference.

26. The at least one processor of claim 19, wherein the fifth module that calculates the transmission coefficients comprises:
a seventh module that employs the first set of CSI for predicting channel gain for the transmission set of nodes;
an eighth module that determines a ratio of predicted channel gain and actual channel gain reported from a prior CoMP transmission involving the UE;
a ninth module that derives a gain offset from the ratio of predicted channel gain and actual channel gain; and
a tenth module that employs the gain offset at least in part for at least one of predicting channel quality or link adaptation for the scheduled CoMP transmission for the UE.

27. The at least one processor of claim 19, further comprising:
- a seventh module that sends data packets for the CoMP transmission to the transmission set of nodes in preparation for the CoMP transmission; and
- an eighth module that transmits one of the plurality of signals in accordance with an associated signal coefficient as part of implementing the CoMP transmission.

28. A computer program product, comprising:
a non-transitory computer-readable medium, comprising:
- a first set of codes for causing a computer to receive, at a node of a wireless network, a first set of channel state information (CSI) from a set of user equipments (UEs) served by the node, the first set of CSI comprising information related to channel conditions between a UE of the set of UEs and nodes of the wireless network that are within a reporting set of the UE, the reporting set comprising nodes having respective signal strengths, as observed by the UE, above a minimum signal strength threshold;
- a second set of codes for causing the computer to schedule, by the node independently of scheduling decisions of a backhaul reporting set of nodes, a coordinated multipoint (CoMP) transmission for the UE based on the first set of CSI, the backhaul reporting set comprising nodes of the wireless network that serve UEs expected to observe interference as a result of the scheduled CoMP transmission for the UE;
- a third set of codes for causing the computer to receive, by the node after scheduling the CoMP transmission for the UE, a second set of CSI from the backhaul reporting set based on scheduling decisions of nodes of the backhaul reporting set;
- a fourth set of codes for causing the computer to determine, at the node, a transmission set of nodes of the wireless network for the scheduled CoMP transmission based at least in part on the second set of CSI;
- a fifth set of codes for causing the computer to calculate, at the node, transmission coefficients for a plurality of signals of the CoMP transmission to be transmitted by respective nodes of the transmission set; and
- a sixth set of codes for causing the computer to send the transmission coefficients to the respective nodes of the transmission set of nodes for use by the respective nodes in the CoMP transmission.

29. The computer program product of claim 28, wherein the scheduling of the CoMP transmission comprises employing CSI measured exclusively within a cell comprising the node.

30. The computer program product of claim 28, wherein a number of nodes within the reporting set is capped at a predetermined maximum number.

31. The computer program product of claim 28, wherein the backhaul reporting set comprises nodes of the wireless network that serve respective neighboring UEs that will be affected by interference from the plurality of signals of the CoMP transmission, and includes the transmission set of nodes.

32. The computer program product of claim 31, wherein the plurality of signals of the CoMP transmission comprise data transmissions configured to reach the UE and data transmissions configured to mitigate interference to one or more of the neighboring UEs.

33. The computer program product of claim 28, further comprising a seventh set of codes for causing the computer to employ the second set of CSI or the first set of CSI to select the transmission set of nodes out of the backhaul reporting set, and optionally cap the transmission set of nodes at a predetermined maximum number.

34. The computer program product of claim 28, wherein the fifth set of codes for causing the computer to calculate the transmission coefficients comprises at least one of:
- a seventh set of codes for causing the computer to perform computation of the transmission coefficients for nodes within the reporting set to achieve interference mitigation for the CoMP transmission; or
- an eighth set of codes for causing the computer to determine residual interference to the UE resulting from nodes of the wireless network outside of the reporting set, and calculating the transmission coefficients based at least in part on the residual interference.

35. The computer program product of claim 28, wherein the fifth set of codes for causing the computer to calculate the transmission coefficients comprises:
- a seventh set of codes for causing the computer to employing the first set of CSI for predicting channel gain for the transmission set of nodes;
- a eighth set of codes for causing the computer to determining a ratio of predicted channel gain and actual channel gain reported from a prior CoMP transmission involving the UE;
- a ninth set of codes for causing the computer to deriving a gain offset from the ratio of predicted channel gain and actual channel gain; and
- a tenth set of codes for causing the computer to employing the gain offset at least in part for at least one of predicting channel quality or link adaptation for the scheduled CoMP transmission for the UE.

36. The computer program product of claim 28, further comprising:
- a seventh set of codes for causing the computer to send data packets for the CoMP transmission to the transmission set of nodes in preparation for the CoMP transmission; and
- an eighth set of codes for causing the computer to transmit one of the plurality of signals in accordance with an associated signal coefficient as part of implementing the CoMP transmission.

* * * * *